(12) United States Patent
Ohkubo

(10) Patent No.: US 6,717,674 B2
(45) Date of Patent: Apr. 6, 2004

(54) COLOR CHART, CHART IMAGE DATA RECORDING MEDIUM, PROFILE PRODUCING APPARATUS, PROFILE PRODUCING METHOD, AND PROFILE PRODUCING PROGRAM STORAGE MEDIUM

(75) Inventor: Akito Ohkubo, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 121 days.

(21) Appl. No.: 09/984,808

(22) Filed: Oct. 31, 2001

(65) Prior Publication Data

US 2002/0051131 A1 May 2, 2002

(30) Foreign Application Priority Data

Oct. 31, 2000 (JP) ........................................ 2000-333156

(51) Int. Cl.$^7$ .................................................. G01J 3/52
(52) U.S. Cl. .......................................... 356/421; 434/98
(58) Field of Search ...................... 356/421; 434/98; 358/406; 382/167

(56) References Cited

U.S. PATENT DOCUMENTS

| | | | | |
|---|---|---|---|---|
| 4,717,954 A | * | 1/1988 | Fujita et al. | 356/402 |
| 4,992,050 A | * | 2/1991 | Edwards | 434/98 |
| 5,416,613 A | * | 5/1995 | Rolleston et al. | 358/406 |
| 5,852,675 A | * | 12/1998 | Matsuo et al. | 382/167 |
| 6,234,801 B1 | * | 5/2001 | Hsu | 434/98 |
| 2002/0122589 A1 | * | 9/2002 | Reiman et al. | 382/167 |

FOREIGN PATENT DOCUMENTS

| | | | |
|---|---|---|---|
| JP | 7-209946 | 8/1995 | .......... G03G/15/01 |
| JP | 9-173376 | 7/1997 | .......... A61F/9/007 |
| JP | 11-261831 | 9/1999 | .......... H04N/1/60 |

OTHER PUBLICATIONS

Patent Abstracts of Japan 07–209946.

Patent Abstracts of Japan 09–173376.

Patent Abstracts of Japan 11–261831.

* cited by examiner

*Primary Examiner*—F. L. Evans
*Assistant Examiner*—Kara Geisel
(74) *Attorney, Agent, or Firm*—Sughrue Mion, PLLC

(57) ABSTRACT

There is implemented a profile producing high in general-purpose properties. A first patch group consisting of patches of which colors are relatively near the saturated color is disposed in front in read order determined beforehand, and a second patch group consisting of patches of which colors are relatively near neutral tints is disposed in the rear.

25 Claims, 19 Drawing Sheets

COLOR CHART, CHART IMAGE DATA RECORDING MEDIUM, PROFILE PRODUCING APPARATUS, PROFILE PRODUCING METHOD, AND PROFILE PRODUCING PROGRAM STORAGE MEDIUM

BACKGROUND OF THE INVENTION

1. Field of the Invention

The present invention relates to a color chart, a chart image data recording medium storing chart image data representative of a color chart, a profile producing method and a profile producing apparatus for producing a profile using a color chart and a profile producing program storage medium storing a profile producing program which causes a computer to operate as the profile producing apparatus when the profile producing program is incorporated into the computer.

2. Description of the Related Art

Hitherto, there is known a profile producing method and a profile producing apparatus for producing a profile defining an association between coordinates of a color space depending on a device such as a printer and a scanner for performing input and output of images and coordinates of a color space independent of the device, using a color chart in which color patches are arranged. For example, in a shop photographic print system in which an image of a photographic print is read by a scanner and fed to a computer in form of an original image, so that a copy of the original image is created on the computer and is outputted on the photographic print by a printer, the computer operates as the profile producing apparatus so that a profile suitable for the scanner and the printer is created in form of for example an LUT (Look Up Table). And a color conversion between the color space depending on the device and the color space independent of the device is applied to the original image in accordance with the profile, so that a color of the photographic print of the original is coincident with a color of the photographic print of the copy.

Hitherto, to create the profile, there are used a color chart referred to as IT8 for example and a lattice color chart in which color patches corresponding to lattice points on a predetermined lattice defined in a color space are arranged in a similar fashion to that of lattice points on the color space. Further, there is used a dedicated color chart according to a performance of a system and a device.

By the way, as recent network technology advances, a field of giving and taking image data between devices is expanded, and devices, which are connected to a certain system, are diversified. It is impossible to prepare all profiles of such diverse devices beforehand. Thus, it is desired to offer a profile producing apparatus and a color chart, which are high in general-purpose properties, capable of producing suitable profile meeting with those diverse devices. However, the above-mentioned dedicated color chart and a profile producing apparatus premising such a dedicated color chart are of course low in general-purpose properties.

It is needed for IT8 and a lattice color chart that all the patches of the color chart are read at the time of creation of a profile, as a general rule. However, the number of patches to be used in creation of a profile is different in accordance with a performance of a device. That is, in the event that a performance of a device is excellent, a profile is created in accordance with data in which a number of patches having a number of colors including fine color difference of colors is read, so that a profile, which is high in continuity, is obtained. On the other hand, in the event that a performance of a device is wrong, it is difficult to implement a faithful reproduction of a plurality of colors having fine color differences. Accordingly, in the event that a profile is created in accordance with data in which a number of patches having a number of colors including fine color difference of colors is read, the profile is low in continuity. In this case, it is rather higher in continuity that a profile is created in accordance with data in which a few number of patches having a few number of colors clear in color difference of colors is read. For this reason, IT8, the lattice color chart, and the profile producing apparatus premising those color charts cannot cope with a plurality of sorts of devices mutually greatly different in performance, and are low in general-purpose properties.

SUMMARY OF THE INVENTION

In view of the foregoing, it is an object of the present invention to provide a color chart which is high in general-purpose properties, a chart image data recording medium storing chart image data representative of such a color chart, a profile producing method and a profile producing apparatus for producing a profile using such a color chart and a profile producing program storage medium storing a profile producing program which causes a computer to operate as the profile producing apparatus when the profile producing program is incorporated into the computer.

To achieve the above-mentioned object, the present invention provides a first color chart comprising a plurality of patches in which colors of the plurality of patches are read in accordance with a patch reading order determined beforehand, said color chart including:

a first patch group comprising a plurality of patches each having a predetermined color; and a second patch group comprising a plurality of patches having colors among said predetermined colors, said plurality of patches being read later than the patches constituting said first patch group in accordance with said patch reading order.

Colors of the patches of the second patch group are able to be approximately computed in accordance with an interpolation computation based on the colors of the patches of the first patch group. Thus, to meet a performance of a device, both the first patch group and the second patch group, or only the first patch group are read to be used for creation of a profile, and thereby enhancing general-purpose properties.

In the first color chart according to the present invention as mentioned above, it is preferable that said first patch group includes patches of saturated colors of red, green, blue, cyan, magenta, yellow, white and black.

Since those saturated colors are colors corresponding to corners of the general color space, it is difficult to compute those saturated colors in accordance with an interpolation computation based on other colors.

Further, in the first color chart according to the present invention as mentioned above, it is preferable that patches, which belong to either one of said first patch group and said second patch group, occupy over half in its entirety.

This feature makes it possible to enhance effects of the present invention.

Furthermore, in the first color chart according to the present invention as mentioned above, it is preferable that same gray patches are disposed at a plurality of places.

The same gray patches disposed at a plurality of places are sensitive to input and output performance of colors by devices. Thus, this feature makes it possible to verify a performance of a device. Further, an arrangement of the same gray patches together with the first patch group and said second patch group makes it possible to know a performance of a device at the time of creation of a profile.

To achieve the above-mentioned object, the present invention provides a second color chart comprising a plurality of chart sheets which are sequentially read in accordance with a sheet reading order determined beforehand, said color chart comprising:

a faster-read sheet in which a plurality of patches each having a predetermined color are arranged, said faster-read sheet being relatively faster read in accordance with said sheet reading order; and a later-read sheet in which a plurality of patches having colors among said predetermined colors are arranged, said later-read sheet being relatively later read in accordance with said sheet reading order.

Colors of patches of the later-read sheet can be approximately computed in accordance with an interpolation computation based on the colors of the patches of the faster-read sheet. Thus, it is possible to create a profile through reading the chart sheets by the necessary number of sheets to meet a performance of a device.

In the second color chart according to the present invention as mentioned above, it is preferable that in at least one of said plurality of chart sheets, same gray patches are disposed at a plurality of places.

Further, in the second color chart according to the present invention as mentioned above, it is preferable that in said plurality of chart sheets, same gray patches are disposed at common places of the chart sheets.

When colors of those gray patches are read, it is possible to verify a stability in an in-plane direction of input and output of colors of devices or a stability on an elapse basis.

In the color chart of the present invention, it is preferable that patches having relatively high saturation of colors are arranged outside more than patches having relatively low saturation of colors.

In general, colors lower in saturation are more easily affected by a disturbance of a performance of a device. A disturbance of a performance of a device is smaller with the more in the vicinity of the center. Thus, the patches having relatively lower color in saturation are disposed at the center, and patches having relatively higher color in saturation are disposed more outside as compared with patches having relatively lower color in saturation. This feature makes it possible to suppress an influence of a disturbance of a performance of a device.

Further, in the color chart of the present invention, it is preferable that said color chart includes patches each having a specific color for accuracy verification.

This feature makes it possible to verify the accuracy of a profile under conditions at the time of creation of a profile, and thus it is possible to accurately know the accuracy of a profile.

To achieve the above-mentioned object, the present invention provides a first chart image data recording medium storing chart image data representative of a color chart comprising a plurality of patches in which colors of the plurality of patches are read in accordance with a patch reading order determined beforehand, said color chart including:

a first patch group comprising a plurality of patches each having a predetermined color; and a second patch group comprising a plurality of patches having colors among said predetermined colors, said plurality of patches being read later than the patches constituting said first patch group in accordance with said patch reading order.

To achieve the above-mentioned object, the present invention provides a second chart image data recording medium storing chart image data representative of a color chart comprising a plurality of chart sheets which are sequentially read in accordance with a sheet reading order determined beforehand, said color chart comprising:

a faster-read sheet in which a plurality of patches each having a predetermined color are arranged, said faster-read sheet being relatively faster read in accordance with said sheet reading order; and a later-read sheet in which a plurality of patches having colors among said predetermined colors are arranged, said later-read sheet being relatively later read in accordance with said sheet reading order.

To achieve the above-mentioned object, the present invention provides a first profile producing apparatus comprising:

a data obtaining section for obtaining read data in which patches, constituting a color chart comprising a plurality of patches in which colors of the plurality of patches are read in accordance with a patch reading order determined beforehand, are read in accordance with the patch reading order, said color chart including a first patch group comprising a plurality of patches each having a predetermined color, and a second patch group comprising a plurality of patches having colors among said predetermined colors, said plurality of patches being read later than the patches constituting said first patch group in accordance with said patch reading order; and a profile producing section for producing a profile defining an association between coordinate points on a color space depending on a device performing at least one of input and output of an color image and coordinate points on a color space independent of said device in accordance with the read data obtained by said data obtaining section.

To achieve the above-mentioned object, the present invention provides a second profile producing apparatus comprising:

a data obtaining section for obtaining read data in which at least one of chart sheets constituting a color chart comprising a plurality of chart sheets which are sequentially read in accordance with a sheet reading order determined beforehand, is read in accordance with the sheet reading order, said color chart comprising a faster-read sheet in which a plurality of patches each having a predetermined color are arranged, said faster-read sheet being relatively faster read in accordance with said sheet reading order, and a later-read sheet in which a plurality of patches having colors among said predetermined colors are arranged, said later-read sheet being relatively later read in accordance with said sheet reading order; and a profile producing section for producing a profile defining an association between coordinate points on a color space depending on a device performing at least one of input and output of an color image and coordinate points on a color space independent of said device in accordance with the read data obtained by said data obtaining section.

According to the profile producing apparatus according to the present invention, it is possible to create a profile in accordance with read data in which the color chart of the present invention is read, and thereby enhancing general-purpose properties.

In the second profile producing apparatus according to the present invention as mentioned above, it is preferable that said data obtaining section obtains the read data by a corresponding number of the chart sheets based on a performance of said device.

When a profile is created through obtaining the read data by a corresponding number of the chart sheets based on a performance of said device, obtaining of the useless read data is avoided, and it is possible to create a great accuracy of profile in accordance with the suitable read data.

Further, in second profile producing apparatus according to the present invention as mentioned above, it is preferable that said data obtaining section obtains the read data one by one corresponding of the chart sheets in accordance with the said sheet reading order, and said data obtaining section judges whether a subsequent chart sheet of read data is to be obtained, and when it is decided that the subsequent chart sheet of read data is to be obtained, said data obtaining section obtains a subsequent chart sheet of read data.

For example, in the event that it is difficult to suitably determine the number of chart sheets beforehand, the data obtaining section obtains the read data one by one corresponding of the chart sheets, and the data obtaining section judges whether a subsequent chart sheet of read data is to be obtained, in accordance with the obtained data and the created profile, so that the read data is suitably obtained.

To achieve the above-mentioned object, the present invention provides a first profile producing method comprising:

a data obtaining step of obtaining read data in which patches, constituting a color chart comprising a plurality of patches in which colors of the plurality of patches are read in accordance with a patch reading order determined beforehand, are read in accordance with the patch reading order, said color chart including a first patch group comprising a plurality of patches each having a predetermined color, and a second patch group comprising a plurality of patches having colors among said predetermined colors, said plurality of patches being read later than the patches constituting said first patch group in accordance with said patch reading order; and a profile producing step of producing a profile defining an association between coordinate points on a color space depending on a device performing at least one of input and output of an color image and coordinate points on a color space independent of said device in accordance with the read data obtained by said data obtaining section.

To achieve the above-mentioned object, the present invention provides a second profile producing method comprising:

a data obtaining step of obtaining read data in which at least one of chart sheets constituting a color chart comprising a plurality of chart sheets which are sequentially read in accordance with a sheet reading order determined beforehand, is read in accordance with the sheet reading order, said color chart comprising a faster-read sheet in which a plurality of patches each having a predetermined color are arranged, said faster-read sheet being relatively faster read in accordance with said sheet reading order, and a later-read sheet in which a plurality of patches having colors among said predetermined colors are arranged, said later-read sheet being relatively later read in accordance with said sheet reading order; and a profile producing step of producing a profile defining an association between coordinate points on a color space depending on a device performing at least one of input and output of an color image and coordinate points on a color space independent of said device in accordance with the read data obtained by said data obtaining section.

To achieve the above-mentioned object, the present invention provides a profile producing program storage medium storing a profile producing program, which causes a computer to serve as the profile producing apparatus comprising the data obtaining section and the profile producing section, as mentioned above, when said profile producing program storage medium is incorporated into said computer.

Incidentally, with respect to the profile producing program and the profile producing method, there are merely shown only the basic embodiments. However, the profile producing program and the profile producing method are not restricted to the basic embodiments as mentioned above, and include various modifications associated with the embodiments of the profile producing apparatus as mentioned above.

DETAILED DESCRIPTION OF PREFERRED EMBODIMENTS

Embodiments of the present invention will be described with reference to the accompanying drawings.

Figure 1:
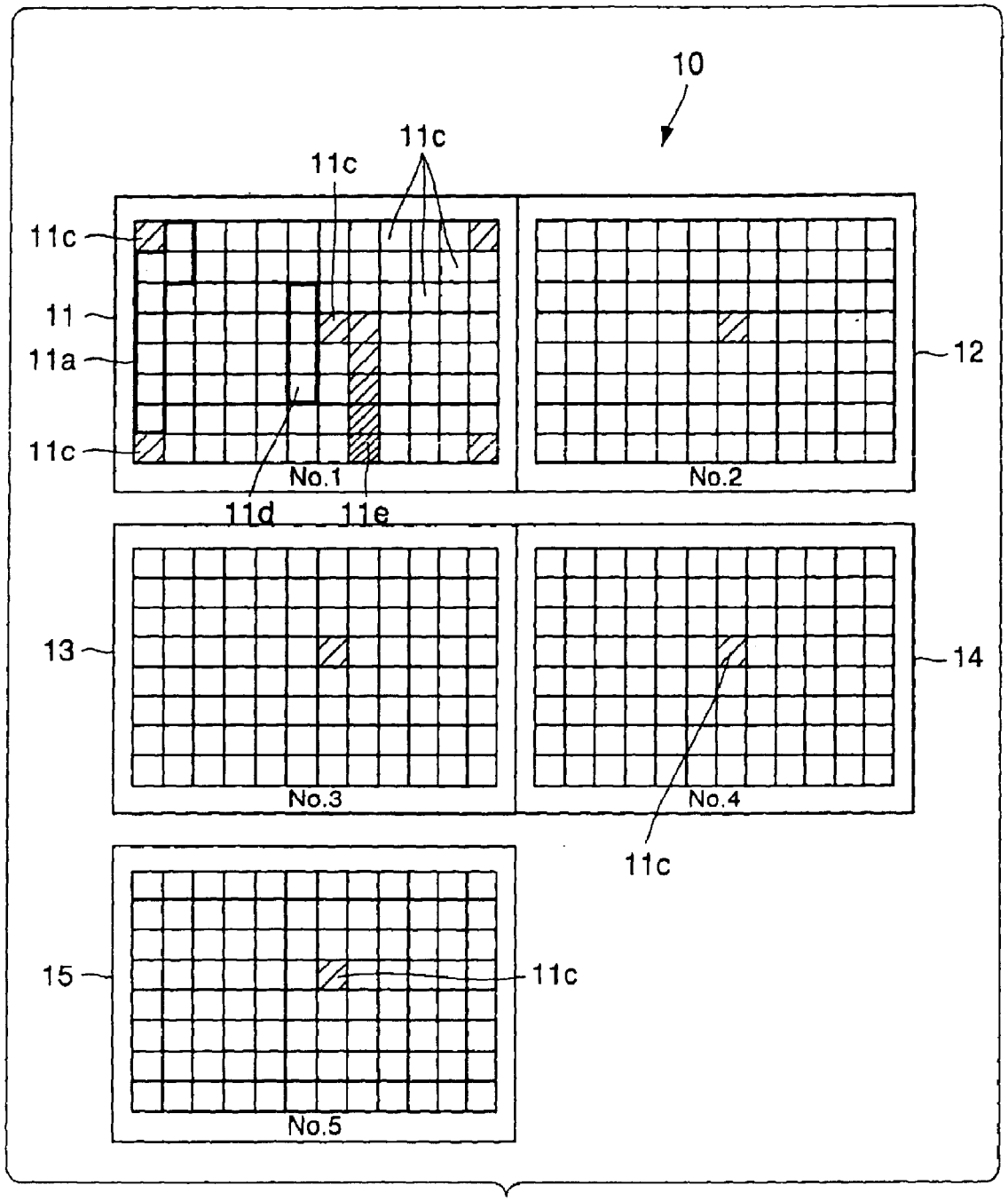
FIG. 1 is a view showing an example of a color chart referred to in the present invention.

FIG. 1 is view showing an example of a color chart referred to in the present invention.

A set of color chart 10 consists of five chart sheets of a first sheet 11 to a fifth sheets 15. Those five chart sheets 11, 12, 13, 14 and 15 are sequentially read from the first sheet 11.

On each of the chart sheets 11, 12, 13, 14 and 15, there are arranged a predetermined number of patches. Patches having colors between colors of the main patches arranged on the first sheet 11 are arranged on the second sheet 12 in form of the main patch. In a similar fashion to that of the above, patches having colors between colors of the main patches arranged on the second sheet 12 are arranged on the third sheet 13 in form of the main patch. Patches having colors between colors of the main patches arranged on the third sheet 13 are arranged on the fourth sheet 14 in form of the main patch. Patches having colors between colors of the main patches arranged on the fourth sheet 14 are arranged on the fifth sheet 15 in form of the main patch. That is, the chart sheet, which is relatively faster read, and the chart sheet, which is relatively later read, satisfy a relation between a faster-read sheet and a later-read sheet, referred to in the present invention.

Patches of each of the chart sheets 11, 12, 13, 14 and 15 are sequentially read from top to bottom on each column one by one starting from the column of the left.

Taking notice of the first sheet 11, at the left end, there are arranged patches 11a of saturated colors of red, green, blue, cyan, magenta, yellow, white and black. Those eight patches 11a constitute a very simple example of a first patch group referred to in the present invention. At the positions involved in reading later than those eight patches 11a, there are arranged a number of patches 11b having colors between the above-mentioned eight saturated colors. Those number of patches 11b constitute an example of a second patch group referred to in the present invention.

With respect to the first sheet 11, there are provided common gray patches 11c on total five places of the center of the chart sheet and four corners. With respect to each of the second sheet 12 to the fifth sheet 15, there is provided the common gray patch 11c on the center of the associated chart sheet. Those common gray patches 11c are used for a verification of a device performance.

The first sheet 11 is also provided with patches 11d having a specific color for verifying a color precision of a profile. A series of gray patches 11e, which is used for a calibration for a gray axis, is placed in the vicinity of the center of the first sheet 11.

With respect to patches arranged on each of the chart sheets 11, 12, 13, 14 and 15, which constitute the color chart 10, except for restricted exceptions such as gray patches for verification of a device performance, patches having relatively higher color in saturation are disposed more outside as compared with patches having relatively lower color in saturation. Thus, the patches of color, which are sensitive in fluctuation of input and output accuracy of color, are located at the places which are small in fluctuation, and thereby suppressing the effect of the fluctuation.

Figure 2:
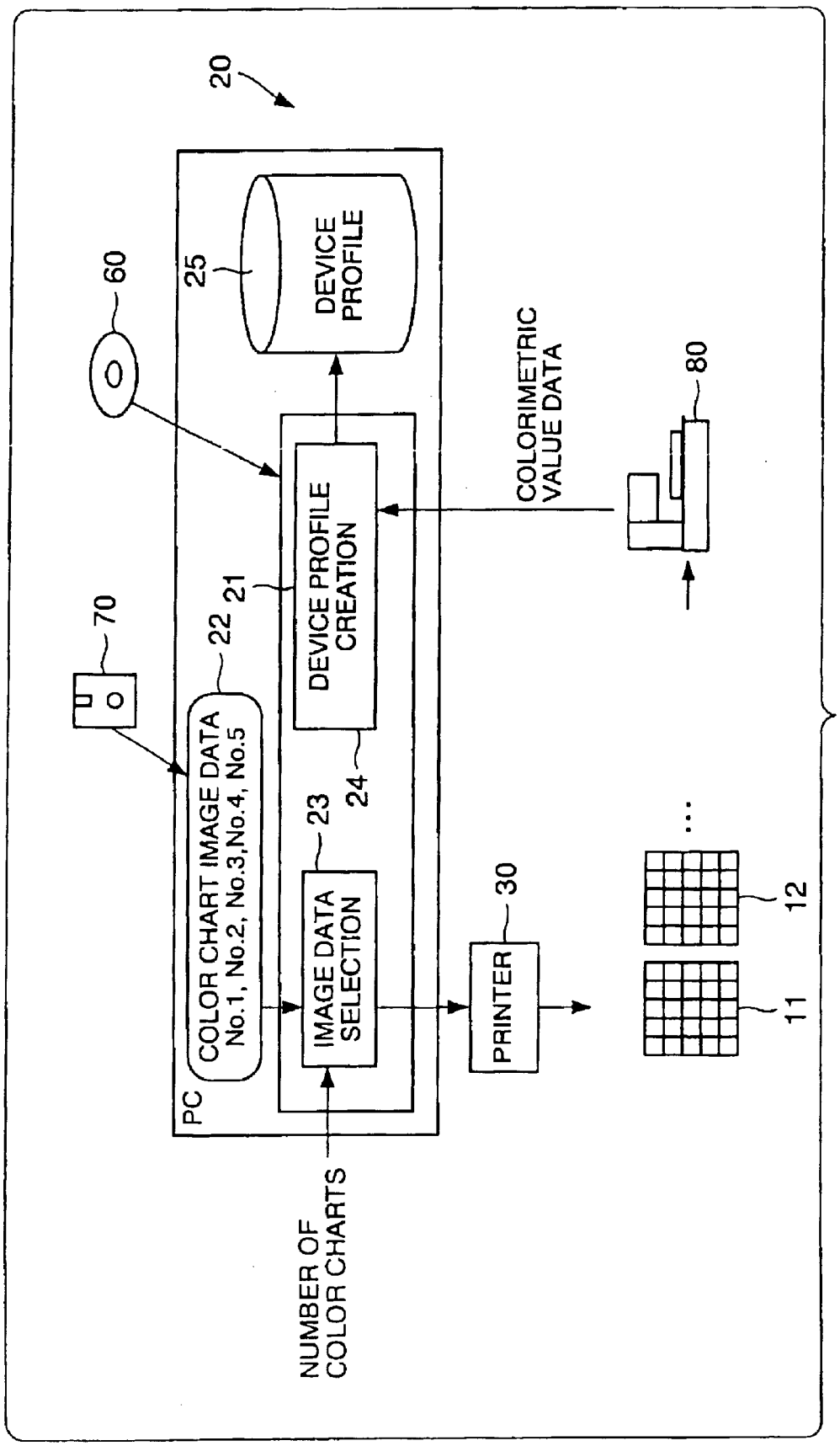
FIG. 2 is a view showing an embodiment of a profile producing apparatus of the present invention.
Figure 3:
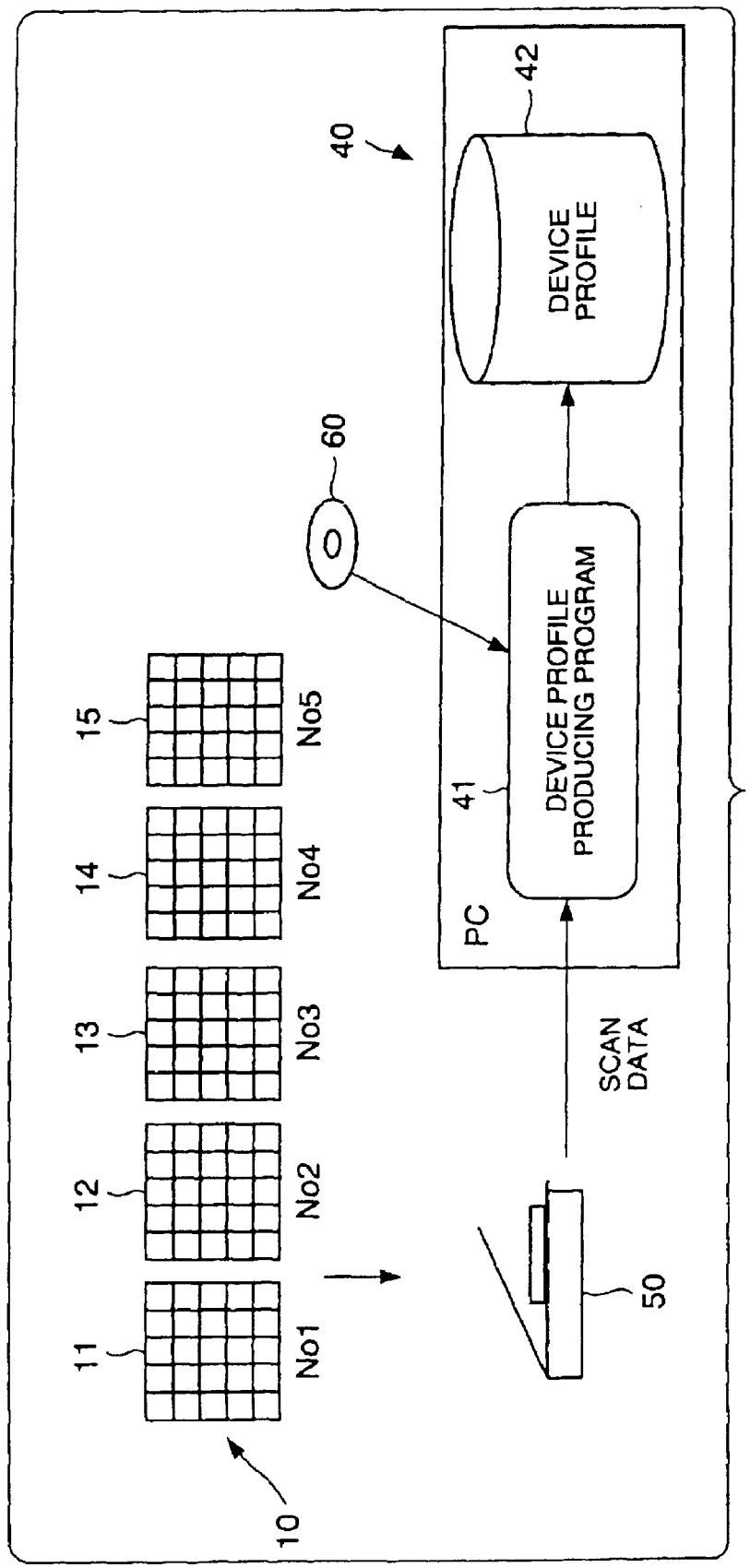
FIG. 3 is a view showing an alternative embodiment of a profile producing apparatus of the present invention.

FIG. 2 is a view showing an embodiment of a profile producing apparatus of the present invention. FIG. 3 is a view showing an alternative embodiment of a profile producing apparatus of the present invention.

A profile producing apparatus 20 shown in FIG. 2 creates a profile for a printer 30. A profile producing apparatus 40 shown in FIG. 3 creates a profile for a printer 50. Those profile producing apparatus 20 and the profile producing apparatus 40 are of the basic embodiments of the present invention.

Here, each of the profile producing apparatuses 20 and 40 shown in FIGS. 2 and 3 is constituted of a personal computer. The personal computers are loaded with CD-ROMs 60 storing profile producing programs 21 and 41 which cause the personal computers as the profile producing apparatuses 20 and 40, respectively, so that the profile producing programs 21 and 41 are up loaded onto the associated personal computers, respectively. When the profile producing programs 21 and 41 are executed, the associated personal computers operate as an embodiment of a profile producing apparatus of the present invention.

The personal computer, which constitutes the profile producing apparatus 20 shown in FIG. 2, is loaded with a floppy disk 70 storing chart image data 22 representative of the color chart 10 shown in FIG. 1, so that the chart image data 22 is up loaded onto the personal computer. The floppy disk 70 corresponds to an embodiment of a chart image data storage medium of the present invention.

Hereinafter, there will be described a procedure of producing a profile using the profile producing apparatuses 20 and 40.

On the profile producing apparatus 20 shown in FIG. 2, of a plurality of chart sheets (here five sheets) constituting a color chart, the number of chart sheets necessary is designated. For example, the first sheet to the third sheet are necessary, "three sheets" is designated. This number of sheets is decided and designated by a user in accordance with performance of the printer 30.

The profile producing apparatus 20 designated in the number of chart sheets selects chart image data representative of chart sheets of the corresponding designated number in accordance with a selection routine 23 of the profile producing program 21, and outputs the same to the printer 30. The printer 30 outputs for example the first sheet 11 in accordance with the chart image data.

Thus, a color measurement machine 80 measures colors of the respective patches arranged on the chart sheets 11, 12, . . . outputted by the printer 30, so that colorimetric values are obtained by the number corresponding to performance of the printer 30. Colorimetric data representative of the colorimetric values is fed to the profile producing apparatus 20 in accordance with a profile producing routine 24 of the profile producing program 21, so that a profile 25 for the printer 30 is produced in accordance with the calorimetric data. The profile producing routine 24 will be described later.

In the event that the profile producing apparatus 40 shown in FIG. 3 is used to create a profile, first, a user selects chart sheets of the number according to performance of the scanner 50, of five sheets of chart sheets 11, 12, 13, 14 and 15 constituting the color chart 10 shown in FIG. 1. And the scanner 50 reads the selected chart sheets in turn from the first sheet 11 so that scan data for patches of the number corresponding to the performance of the scanner 50 are obtained. Those scan data are fed to the profile producing apparatus 40 in accordance with a profile producing routine of the profile producing program 41, so that a profile 42 for the scanner 50 is produced in accordance with the scan data.

Next, there will be described a profile producing routine. Here, it is assumed that a profile of an LUT form is produced.

Figure 4:
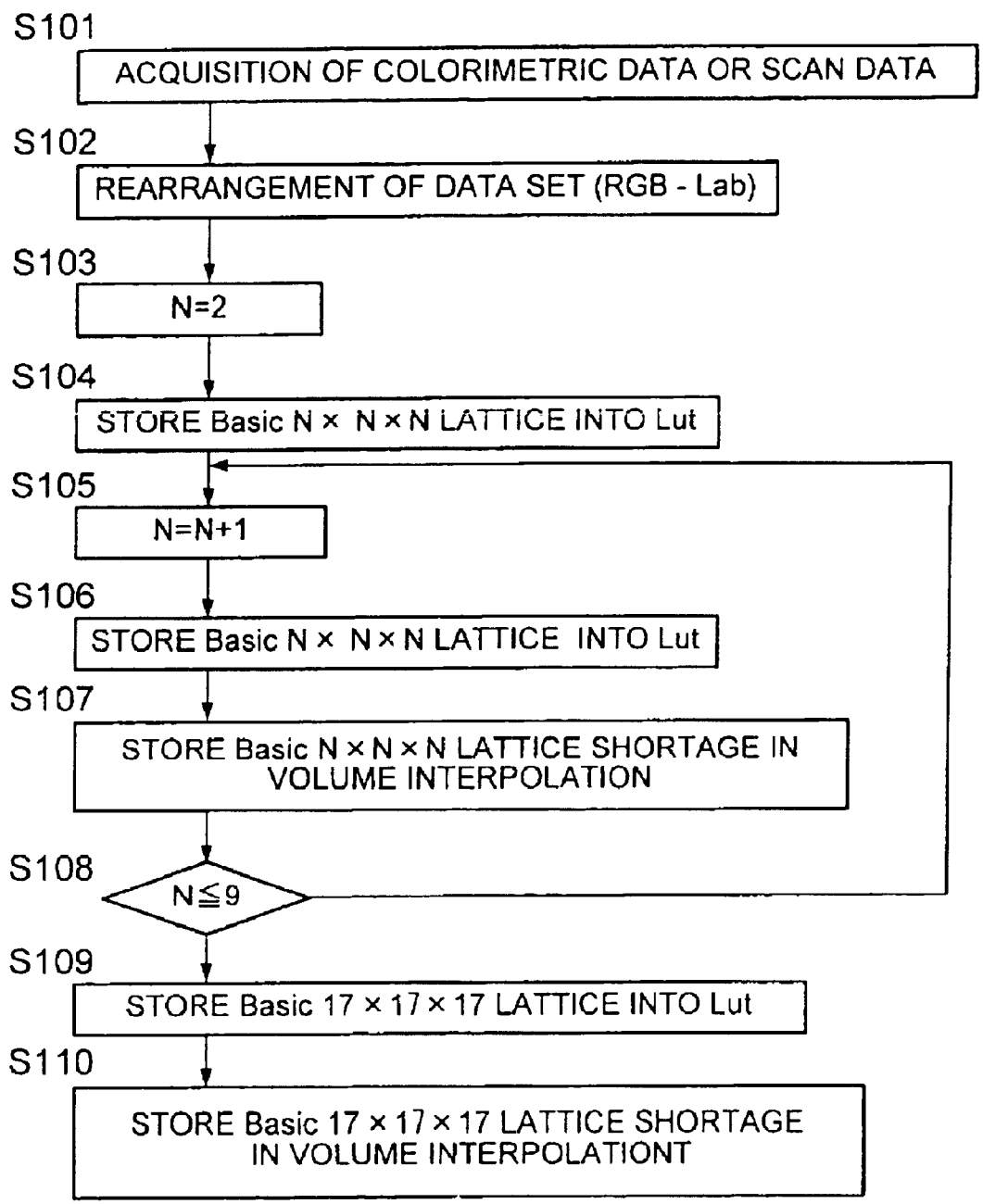
FIG. 4 is a flowchart useful for understanding a profile producing routine.

FIG. 4 is a flowchart useful for understanding a profile producing routine.

When the profile producing routine is initiated, first, a series of colorimetric data or scan data is obtained (a step S101). The series of colorimetric data or scan data is rearranged in such a manner that it is convenient for creation of a profile (a step S102). Here, there is assumed a three-dimensional lattice in a color space represented in form of a cube-like shaped three-dimensional space from coordinate value (0, 0, 0) to coordinate values (255, 255, 255), and it is assumed that colorimetric data and the like for patches associated with lattice points on the lattice are obtained. As the color space, there are considered an RGB color space, a CMY color space, and another color space. However, here, for the sake of convenience of explanation, as the color space, the RGB color space is assumed. A lattice assumed on the RGB color space is referred to as N×N×N lattice (N=2–9, 17). 2×2×2 lattice is a lattice in which lattice points are represented by coordinate values (R, G, B) wherein elements R, G and B have any one of the value "0" and the value "255". That is, the lattice points in the 2×2×2 lattice exist 8 pieces, which correspond to 8 vertexes of a cube representative of an RGB color space.

3×3×3 lattice is a lattice in which lattice points are represented by coordinate values (R, G, B) wherein elements R, G and B have any one of the value "0", the value "140" and the value "255". However, hereinafter, in order to avoid an overlap of the lattice points in notion, the lattice points, wherein one or more elements of the elements R, G and B of the coordinate values (R, G, B) have the value "140", are referred to as "lattice points of 3×3×3 lattice.

Hereinafter, in a similar fashion, 4×4×4 lattice is a lattice in which lattice points are represented by coordinate values (R, G, B) wherein elements R, G and B have any one of the value "0", the value "140", the value "210" and the value "255". The lattice points, wherein one or more elements of the elements R, G and B of the coordinate values (R, G, B) have the value "210", are referred to as "lattice points of 4×4×4 lattice.

5×5×5 lattice is a lattice in which lattice points are represented by coordinate values (R, G, B) wherein elements R, G and B have any one of the value "0", the value "70", the value "140", the value "210" and the value "255". The lattice points, wherein one or more elements of the elements R, G and B of the coordinate values (R, G, B) have the value "70", are referred to as "lattice points of 5×5×5 lattice.

6×6×6 lattice is a lattice in which lattice points are represented by coordinate values (R, G, B) wherein elements R, G and B have any one of the value "0", the value "70", the value "140", the value "175", the value "210" and the value "255". The lattice points, wherein one or more elements of the elements R, G and B of the coordinate values (R, G, B) have the value "175", are referred to as "lattice points of 6×6×6 lattice.

7×7×7 lattice is a lattice in which lattice points are represented by coordinate values (R, G, B) wherein elements R, G and B have any one of the value "0", the value "70", the value "105", the value "140", the value "175", the value "210" and the value "255". The lattice points, wherein one or more elements of the elements R, G and B of the coordinate values (R, G, B) have the value "105", are referred to as "lattice points of 7×7×7 lattice.

8×8×8 lattice is a lattice in which lattice points are represented by coordinate values (R, G, B) wherein elements R, G and B have any one of the value "0", the value "70", the value "105", the value "140", the value "175", the value "210", the value "240" and the value "255". The lattice points, wherein one or more elements of the elements R, G and B of the coordinate values (R, G, B) have the value "240", are referred to as "lattice points of 8×8×8 lattice.

9×9×9 lattice is a lattice in which lattice points are represented by coordinate values (R, G, B) wherein elements R, G and B have any one of the value "0", the value "35", the value "70", the value "105", the value "140", the value "175", the value "210", the value "240" and the value "255". The lattice points, wherein one or more elements of the elements R, G and B of the coordinate values (R, G, B) have the value "35", are referred to as "lattice points of 9×9×9 lattice.

17×17×17 lattice is a lattice in which lattice points are represented by coordinate values (R, G, B) wherein elements R, G and B have any one of the value "0", the value "17", the value "35", the value "52", the value "70", the value "87", the value "105", the value "122", the value "140", the value "157", the value "175", the value "192", the value "210", the value "225", the value "240", the value "247" and the value "255". The lattice points, which do not overlap with the lattice points of the above-mentioned 2×2×2 lattice to 9×9×9 lattice, are referred to as "lattice points of 17×17×17 lattice. It is assumed that with respect to patches associated with the lattice points of 17×17×17 lattice, only patches associated with the lattice points of a part of the periphery of the gray axis are prepared.

When the patches of the color chart shown in FIG. 1 are read in the reading order as mentioned above, as a general rule, the patches associated with the lattice points of the 2×2×2 lattice, . . . the patches associated with the lattice points of the 9×9×9 lattice, and the patches associated with the lattice points of the 17×17×17 lattice are read in the named order to obtain colorimetric data and scan data.

A patch group consisting of patches corresponding to the lattice points of the 2×2×2 lattice, and a patch group consisting of other patches satisfy a relation between the first patch group and the second patch group referred to the present invention. Further, a patch group consisting of patches corresponding to the lattice points of the 3×3×3 lattice, and a patch group consisting of patches corresponding to the lattice points closer than the 3×3×3 lattice also satisfy a relation between the first patch group and the second patch group referred to the present invention. Thus, an establishment of a so-called nesting relation makes it possible to enhance general-purpose properties for various performances of devices.

The principle order, in which measurement data and scan data are obtained, is convenient for creation of the profile. However, with respect to important colors, it exceptionally happens that they are arranged out of this order. Further, in the event that the color chart shown in FIG. 1 is read, the above-mentioned common gray patches, a series of gray patches and patches having specific colors are read, while patches associated with the lattice points are sequentially read. For this reason, in the step S102, sets of calorimetric data and scan data and coordinate values are created, and the sets are rearranged, so that sets associated with the lattice points are arranged in the order named above.

Thus, when the data sets are rearranged, first, the data sets associated with the lattice points of the 2×2×2 lattice are stored in a storage area for a profile in form of a part of LUT constituting the profile (a step S103 and a step S104).

FIGS. 5(A)–5(E) are views showing states that data sets are stored.

Figure 5A:
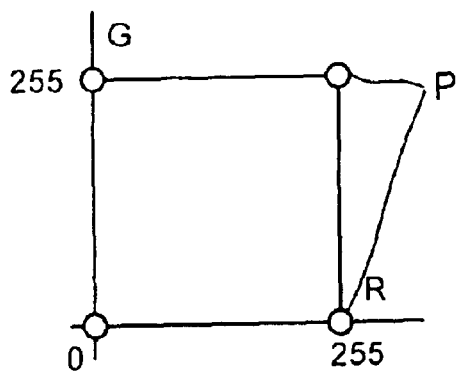
FIGS. 5(A)–5(E) are views showing states that data sets are stored.

FIGS. 5(A)–5(E) show RGB spaces on a two-dimensional basis. FIG. 5(A) shows 2×2×2 lattice. The lattice points of the 2×2×2 lattice are marked with white circles. The white circle indicates that data set associated with the lattice point is stored as a part of the LUT.

When data sets associated with the lattice points of the 2×2×2 lattice are stored in the step S103 and the step S104 in FIG. 4, next, a value of the integer N is stepped up (a step S105), data sets associated with lattice points of N×N×N lattice are stored in the above-mentioned storage area (a step S106).

Figure 5B:
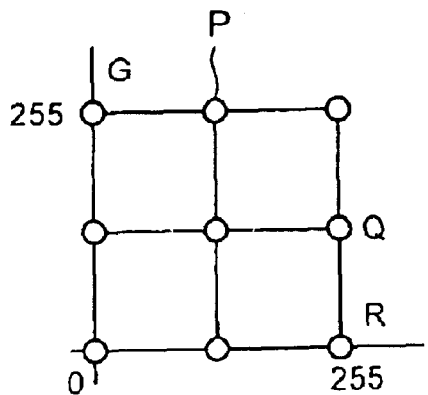

FIG. 5(B) shows 3×3×3 lattice. The lattice points of the 3×3×3 lattice, except for a part, are marked with white circles. A lattice point Q, which is not marked with the white circle, indicates that the data set is insufficient.

In the event that only a part of chart sheets of a plurality of chart sheets constituting a color chart is read, it is considered that reading is terminated on the way of a series of patches associated with the lattice points of the N×N×N lattice. In this case, data sets associated with a part of lattice points would be insufficient.

In the event that data sets become insufficient in the step S106 in FIG. 4, the data sets of the insufficient portion are computed and stored by a volume interpolation based on the data sets which are already stored (a step S107). And if the value of N is less than 9 (a step S108: yes), the step S105 to the step S107 are repeated, so that data sets are sequentially stored up to the data sets associated with the lattice points of the 9×9×9 lattice.

Figure 5C:
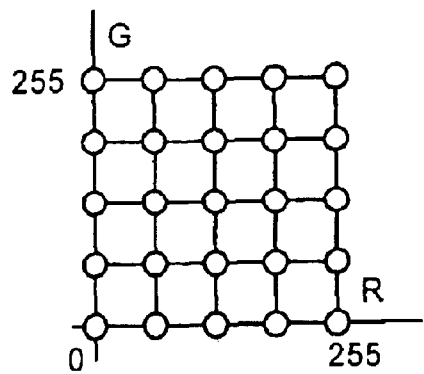

FIG. 5(C) conceptually shows a state that the data sets associated with the lattice points of the N×N×N lattice, where N=9, are stored in its entirety.

In the step S108 of FIG. 4, when it is decided that the value of N reaches 9 or more, then the data sets associated with the lattice points of the 17×17×17 lattice are stored (a step S109).

Figure 5D:
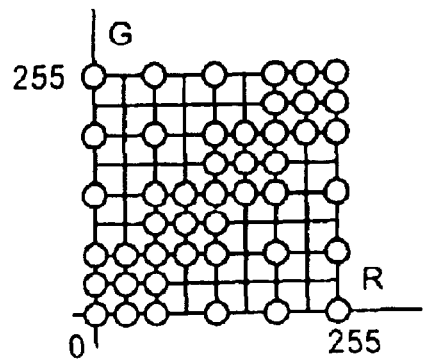

FIG. 5(D) conceptually shows a state that the data sets associated with the lattice points of the 17×17×17 lattice, wherein other portions except for a periphery of the gray axis are insufficient in data sets. The data sets of the insufficient portions are computed and stored by a volume interpolation in a similar fashion to that as mentioned above (a step S110).

Figure 5E:
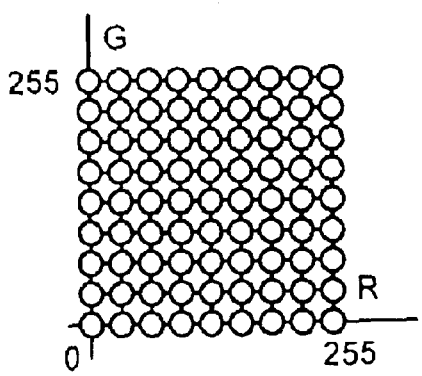

FIG. 5(E) conceptually shows a state that the data sets associated with the lattice points of the 17×17×17 lattice are stored in its entirety.

The LUT, which is created in such a manner that the data sets are stored, as mentioned above, is used as a profile.

Hereinafter, there will be described details of a rearrangement of data sets in the step S102 of FIG. 4.

Figure 6:
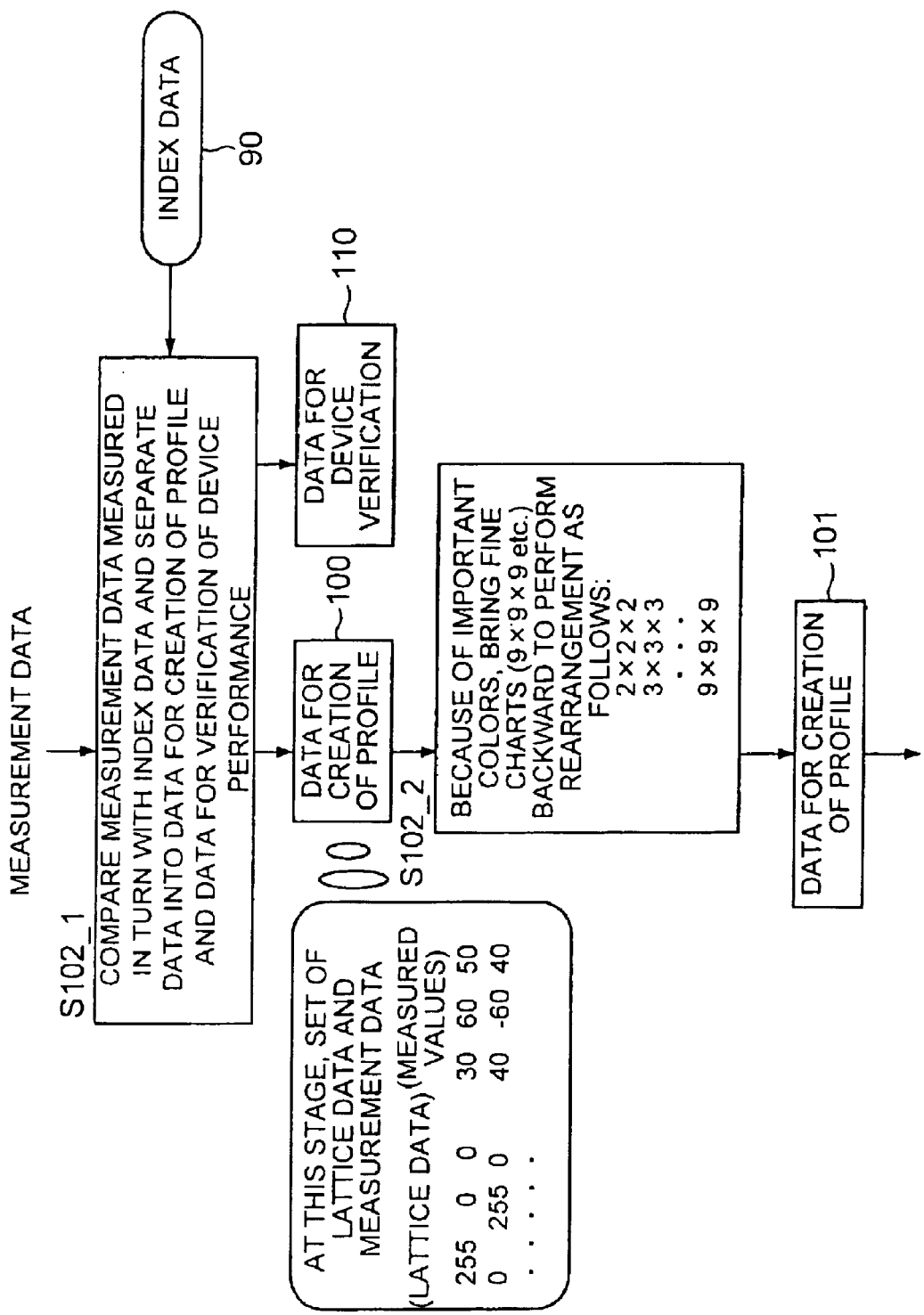
FIG. 6 is a flowchart useful for understanding a rearrangement when a profile for a printer is produced.

FIG. 6 is a flowchart useful for understanding a rearrangement when a profile for a printer is produced.

In the rearrangement, first, index data representative of an arrangement of patches constituting a color chart is associated with a series of calorimetric data so that the above-mentioned data sets are created (a step S102_1).

Figure 7:
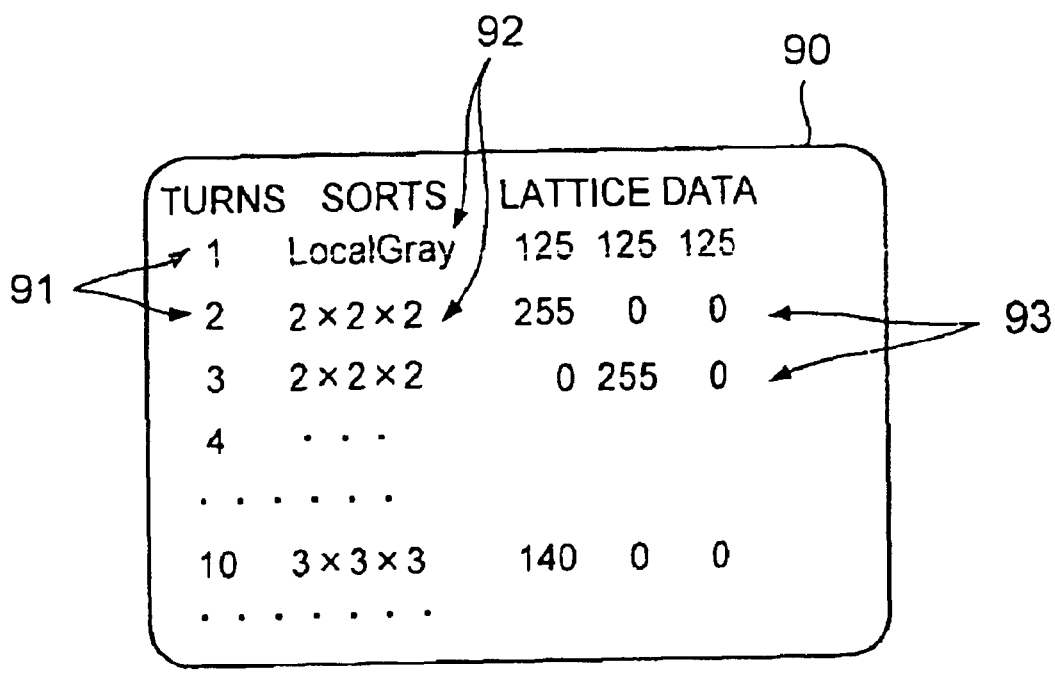
FIG. 7 is a view showing an example of index data.

FIG. 7 is a view showing an example of index data. In index data 90, numbers 91 representative of arrangement order or reading order of patches, sorts 92 of the patches and coordinate values (lattice data) 93 of the color spaces with which the patches are associated, are associated with one another.

In the step S102_1 shown in FIG. 6, the coordinate value 93 is combined with the colorimetric data in accordance with the number 91 of the index data 90 to create data sets. And the data sets are classified into data sets 100 for creation of a profile and data sets 110 for verification of a device and the like in accordance with the sort 92 of patches. A method of utilization of data sets 110 for verification of a device and the like will be described later.

The data sets 100 for creation of a profile, which are classified in the step S102_1, are, as a general rule, arranged in block in form of a group on each lattice point of the N×N×N lattice. But in some case, it may happen that some important colors are exceptionally disposed forward. In this case, a rearrangement is performed in accordance with the number 91 and the sort 92 of the index data 90 (a step S102_2). The data sets 101 for creation of a profile thus rearranged are used to produce a profile as mentioned above.

Figure 8:
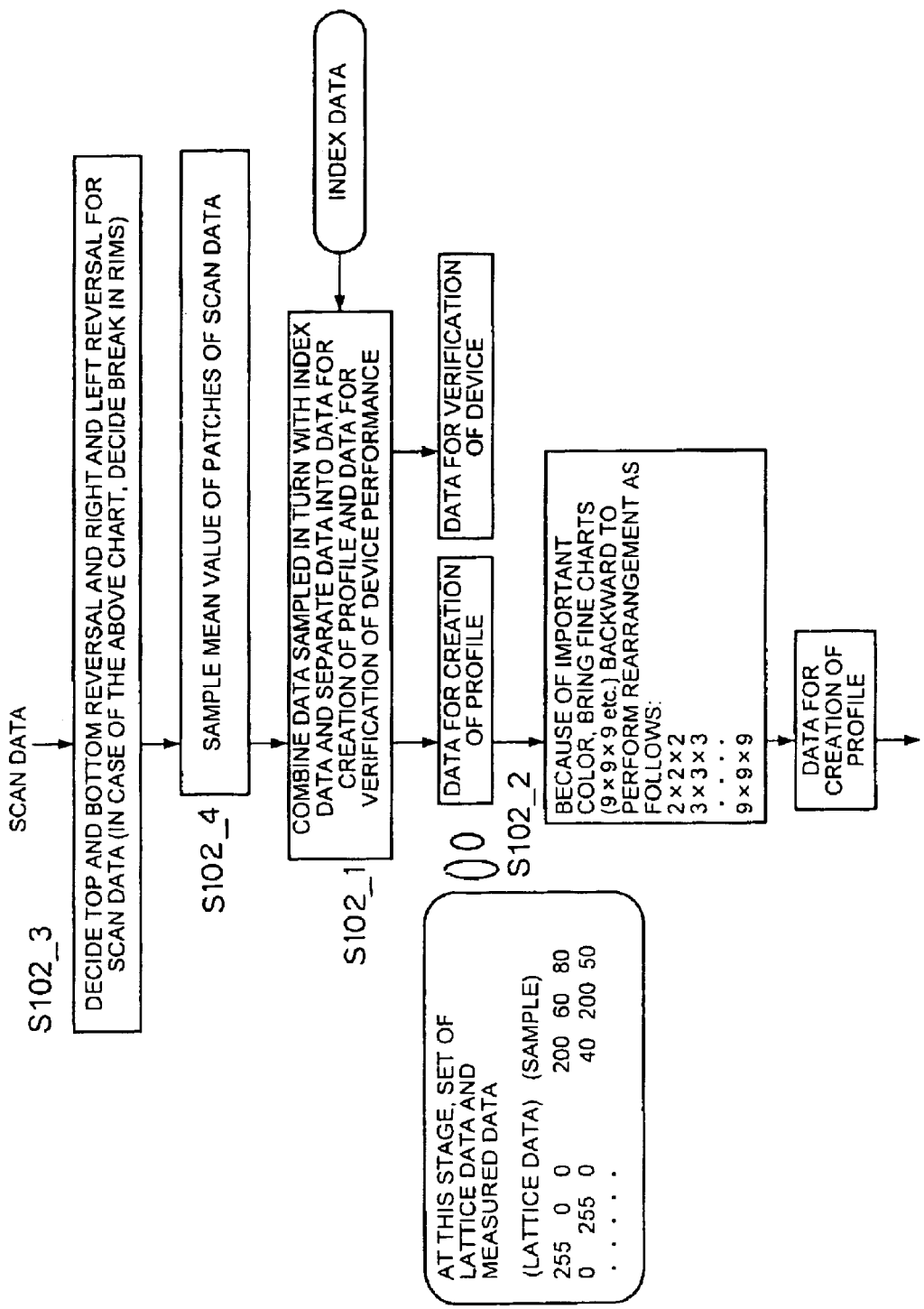
FIG. 8 is a flowchart useful for understanding a rearrangement when a profile for a scanner is produced.

FIG. 8 is a flowchart useful for understanding a rearrangement when a profile for a scanner is produced.

In a rearrangement when a profile for a scanner is produced, first, the top and the bottom and the right and left of the color chart are decided in accordance with the scan data and as the need arises reversion of the top and the bottom and reversion of the right and left are applied (a step S102_3). Further, the mean value of the scan data, wherein a plurality of points are read on one patch, is sampled (a step S102_4).

Thereafter, the same procedures as the step S102_1 and the step S102_2 shown in FIG. 6 are executed.

Incidentally, a case where a profile for a printer is created and a case where a profile for a scanner is created are different from one another in meaning of the above-mentioned N×N×N lattice. That is, according to the printer, colors of the patches are defined by coordinate values of the lattice points of the N×N×N lattice in accordance with chart image data fed from the profile producing apparatus to the printer. On the other hand, according to the scanner, CMY coloring matter density values of the patches of the color chart for instance correspond to coordinate values of the lattice points of the N×N×N lattice. Thus, the profile for the printer is created directly in accordance with calorimetric data and coordinate values, while the profile for the scanner is created indirectly via an intermediate color space.

Figure 9:
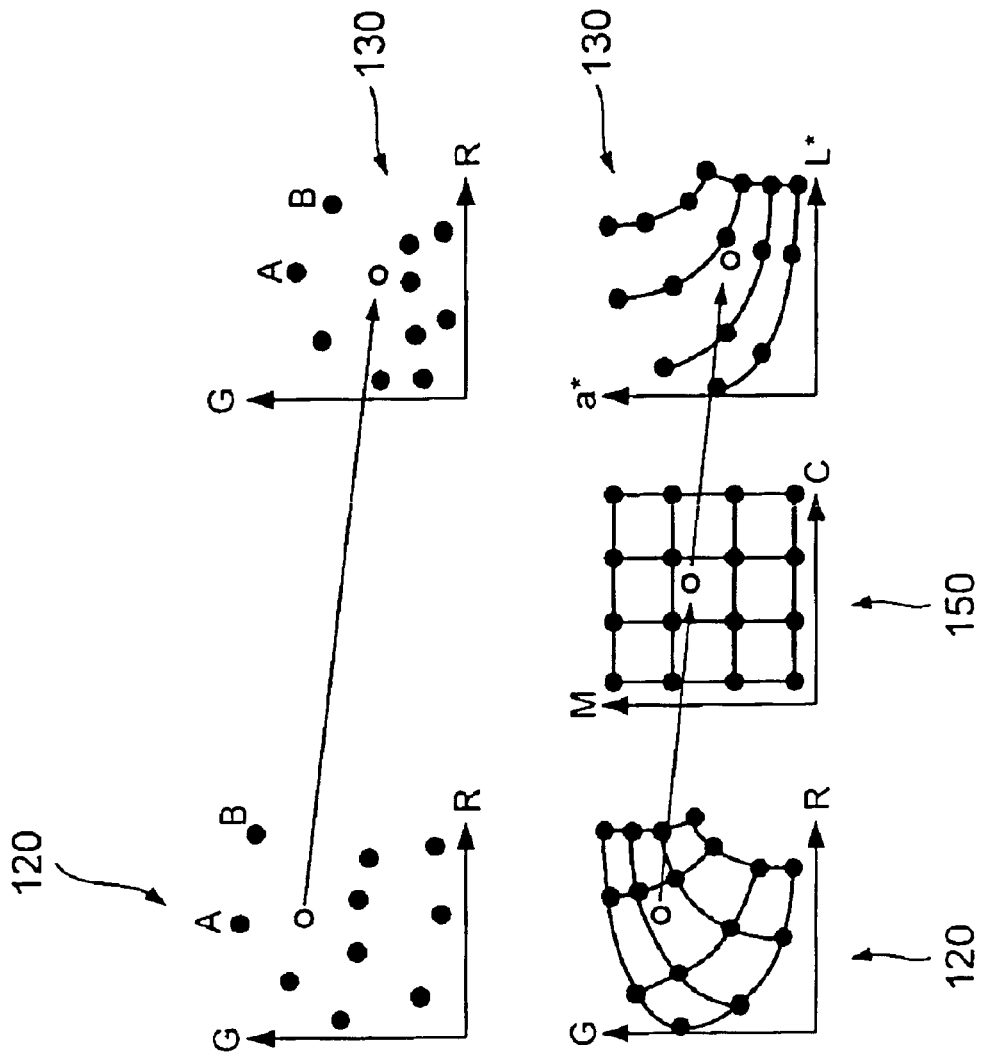
FIGS. 9(A)–9(B) are explanatory views useful for understanding a difference between a printer and a scanner in creation of a profile.

FIGS. 9(A)–9(B) are explanatory views useful for understanding a difference between a printer and a scanner in creation of a profile.

FIG. 9(A) represents two color spaces, which are associated with one another by a profile for a printer, wherein an association between coordinate points on an RGB color space 120 depending on a scanner and coordinate points on a Lab color space 130 independent of a device is defined. The coordinate points on the RGB color space 120, which are obtained from a data set for creating a profile, are distributed irregularly on the RGB color space 120. And the coordinate points on the Lab color space 130, which correspond to those coordinate points, are also distributed irregularly on the Lab color space 130. Accordingly, it is difficult to directly obtain a profile defining the association between those coordinate points from the data set for creating a profile.

FIG. 9(B) is useful for understanding a procedure of creating a profile for a scanner, wherein an association between coordinate points on the RGB color space 120 depending on a scanner and coordinate points on a CMY color space 150 according to CMY coloring matter density of a color char is determined from a data set for creating a profile. The coordinate points on the CMY color space 150 correspond to the lattice points of the above-mentioned N×N×N lattice. And an association between coordinate points on the CMY color space 150 according to CMY coloring matter density of a color char and coordinate points on the Lab color space 130, which are independent of a device, is determined beforehand. Thus, those two associations are combined to determine an association between coordinate points on an RGB color space 120 depending on a scanner and coordinate points on a Lab color space 130 independent of a device is determined.

Next, there will be described applications of the above-mentioned basic embodiment of the present invention.

Figure 10:
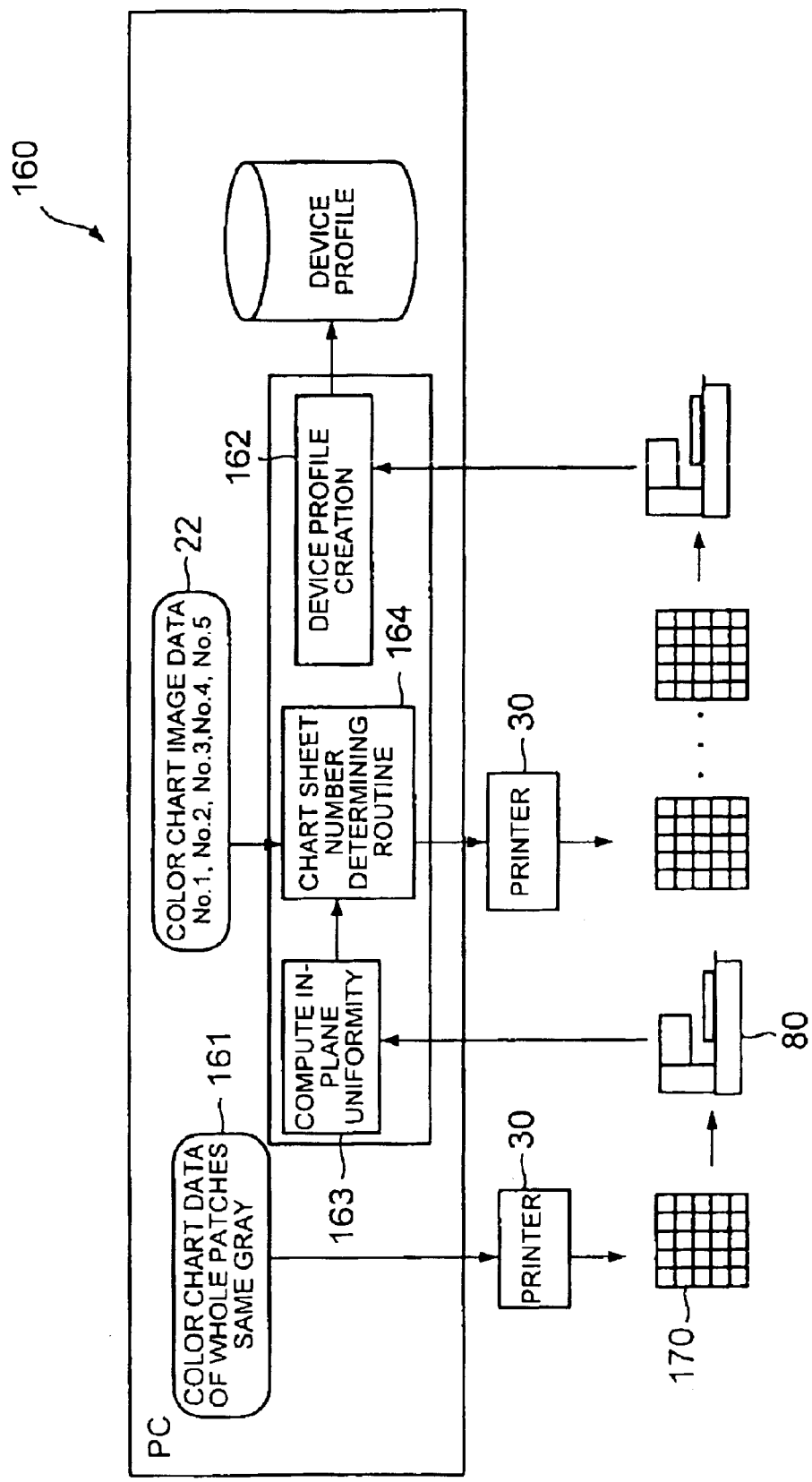
FIG. 10 is a view showing a first applicable embodiment of the present invention.

FIG. 10 is a view showing a first applicable embodiment of the present invention.

A profile producing apparatus 160 shown in FIG. 10 is one in which the profile producing apparatus 20 shown in FIG. 2 is modified.

According to the profile producing apparatus 20 shown in FIG. 2, a user designates the number of chart sheets used in creation of a profile of chart sheets constituting a color chart. On the other hand, according to the profile producing apparatus 160 shown in FIG. 10, the number of chart sheets is automatically computed.

First, a printer 30 receives image data 161 representative of a color chart (a solid image of gray) in which all the patches are the same gray patches, and prints a chart 170 of the solid image of gray. A color measurement machine measures colors of a plurality of places on the chart 170. A profile producing apparatus 160 receives the calorimetric data by an in-plane uniformity computing routine 163 of a profile producing program 162 receives. The in-plane uniformity computing routine 163 computes uniformity of colors of the chart 170 of the solid image of gray in accordance with the colorimetric data, so that a stability of colors in an in-plane direction in output of an image by the printer 30 is determined.

Next, a chart sheet number determining routine 164 of a profile producing program 162 decides the number of chart sheets to be used for creation of a profile of a plurality of chart sheets constituting a color chart represented by chart image data 22 in accordance with the stability thus determined. And the printer 30 receives a determined number of sheets of image data.

The subsequent procedures are the same as those explained in conjunction with FIG. 2.

Figure 11:
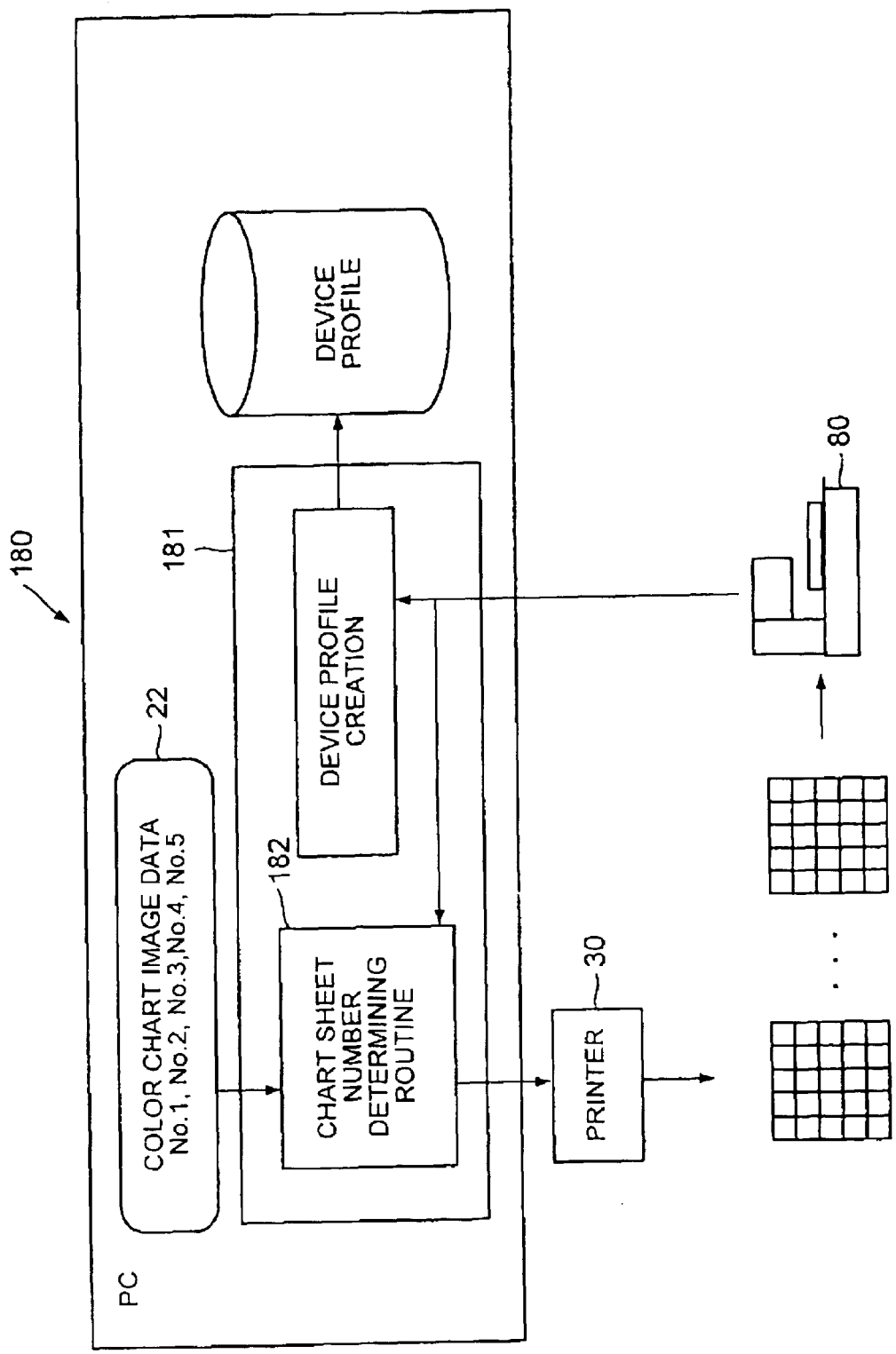
FIG. 11 is a view showing a second applicable embodiment of the present invention.

FIG. 11 is a view showing a second applicable embodiment of the present invention.

According to the profile producing apparatus 180 shown in FIG. 11, first, of the chart image data 22, a predetermined number of sheets (e.g. two sheets) of image data is fed to the printer 30, so that printer 30 outputs the predetermined number of chart sheets. A color measurement machine 80 measures colors of patches of the chart sheets. A chart sheet number determining routine 182 of a profile producing program 181 receives the colorimetric data.

Figure 12:
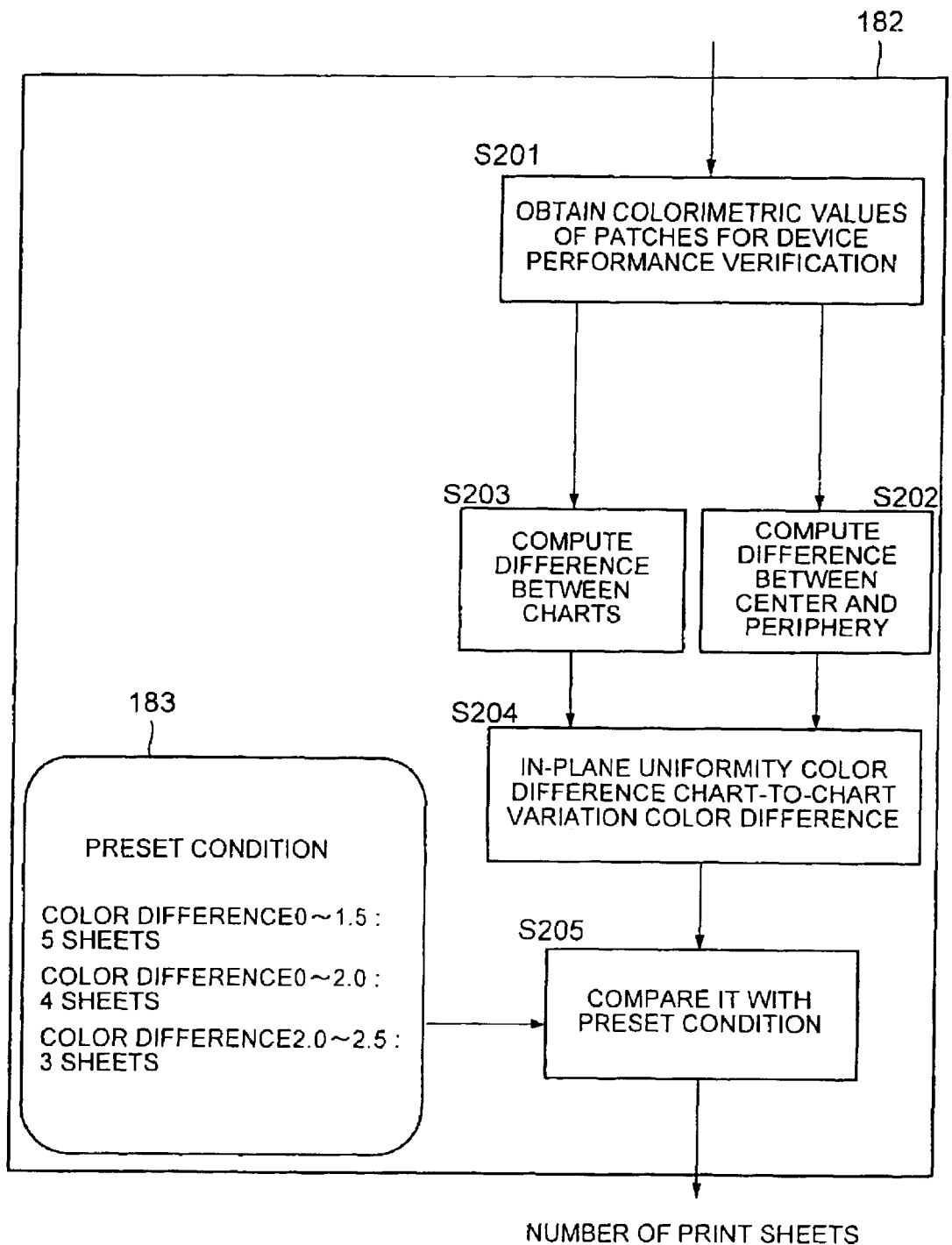
FIG. 12 is a flowchart useful for understanding a decision routine for the number of sheets.

FIG. 12 is a flowchart useful for understanding the chart sheet number determining routine 182 shown in FIG. 11.

The chart sheet number determining routine 182 obtains calorimetric data representative of colors of the common gray patches 11c shown in FIG. 1 for device performance verification, of the calorimetric data obtained from the color measurement machine (a step S201). And there are determined differences of colorimetric data between the center of one chart sheet and the gray patches 11c disposed at the four corners and differences of calorimetric data of the gray patches 11c between mutually different chart sheets (step S202 and step S203). Color difference representative of uniformity of color inside the chart sheet and color difference of color variation between chart sheets are computed in accordance with the differences thus determined (a step S204). Thus, a stability of colors in an in-plane direction and a stability of colors for the lapse of time at the time when the printer 30 outputs an image are determined. The computed color difference is compared with a preset condition 183 in which the association between color differences and the number of necessary chart sheets is defined, so that the necessary number of chart sheets is determined.

Figure 13:
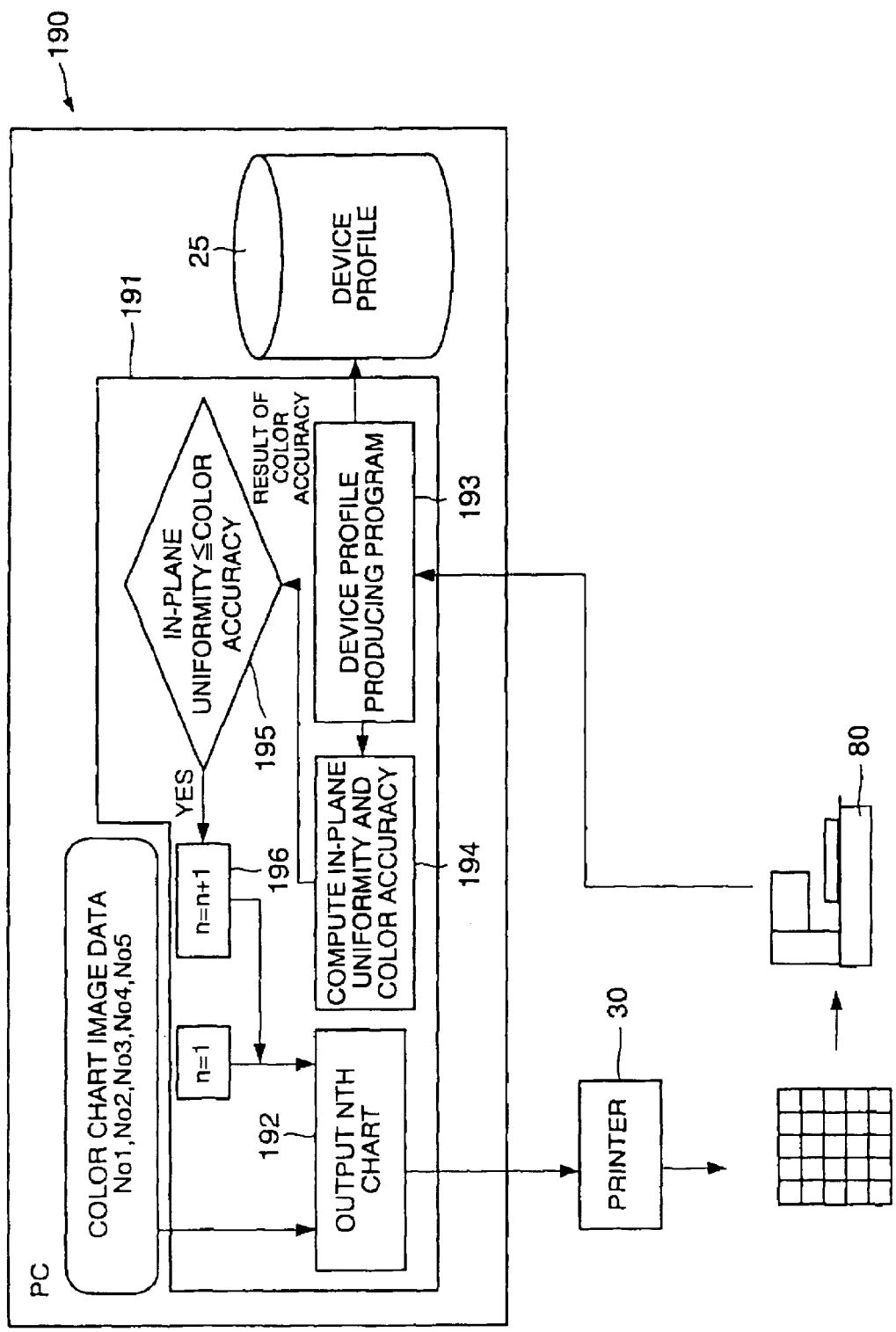
FIG. 13 is a view showing a third applicable embodiment of the present invention.

FIG. 13 is a view showing a third applicable embodiment of the present invention.

In a profile producing apparatus 190 shown in FIG. 13, first, a selection output 192 of image data corresponding to the first sheet of the chart image data 22 is performed so that the image data is fed to the printer 30. The printer 30 outputs the first sheet, and the color measurement machine measures colors of patches of the outputted first sheet. In a profile producing routine 193 of a profile producing program 191, the profile producing apparatus 190 receives calorimetric data, and the profile 25 for the printer 30 is temporarily created.

Next, a computation 194 of uniformity of color in-plane of the chart sheet is executed in accordance with colorimetric data for the device performance verification as mentioned above, of the colorimetric data received by the profile producing apparatus 190. Further, the computation 194 of color accuracy of the temporary profile 25 is also executed in accordance with colorimetric data of patches having specific colors for verifying color accuracy of the profile, of the calorimetric data received by the profile producing apparatus 190. Results of those computations 194 are used to perform a comparison decision 195 between the uniformity of color and the color accuracy. When it is decided that dispersion in color in-plane is smaller than the color accuracy, renewal 196 of the chart sheet number is performed so that the selection output 192 of image data corresponding to the chart sheet indicated by the new number is performed. On the other hand, when the comparison decision 195 decides that dispersion in color in-plane is larger than the color accuracy, the profile 25, which is temporarily created, is saved as a decided profile and the operation is terminated.

According to the above-mentioned embodiment, the common gray patches (patches for device performance verification) and the patches for color accuracy verification are utilized for the purpose of calculation of the number of chart sheets. Hereinafter, there will be described utility systems other than the above-mentioned utilizing systems.

Figure 14:
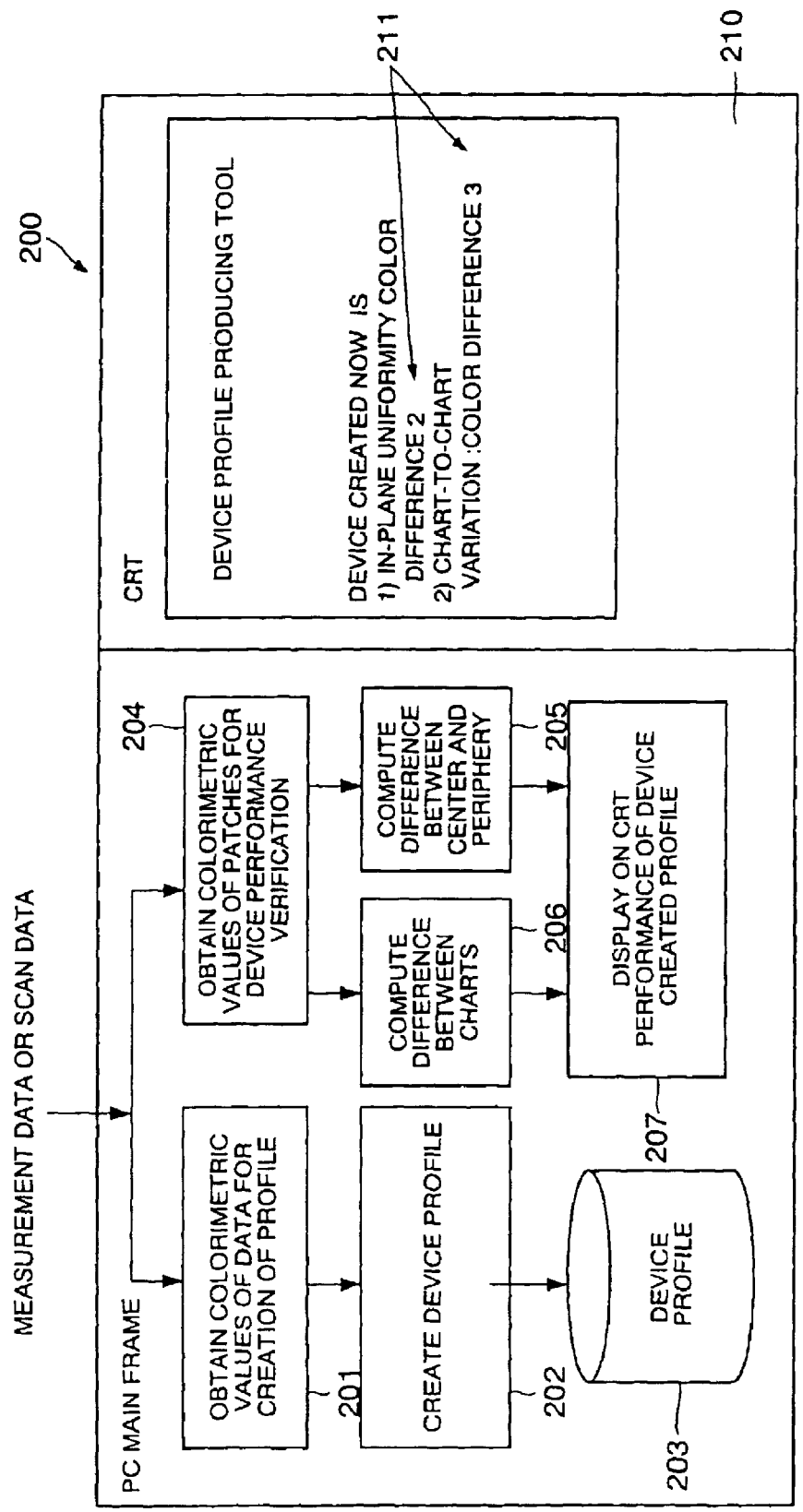
FIG. 14 is a view useful for understanding an example of a utility system of patches for device performance verification.

FIG. 14 is a view useful for understanding an example of a utility system of patches for device performance verification.

A profile producing apparatus 200 shown in FIG. 14 executes, in a similar fashion to that of the profile producing apparatuses 20 and 40 according to the basic embodiment shown in FIGS. 2 and 3, an acquisition 201 of colorimetric data or scan data and a creation 202 of a profile, so that a profile 203 for a printer or a scanner is created.

In parallel to such a creation of the profile, an acquisition of colorimetric data and the like for a device performance verification is performed, and a color difference computation 205 of verification patches among a plurality of places in a chart sheet and a color difference computation 206 of verification patches among a plurality of charts are executed. And a performance display 207, in which the computed color differences are used in form of the device performance, is performed, so that values 211 of the computed color differences are displayed on a CRT 210.

Figure 15:
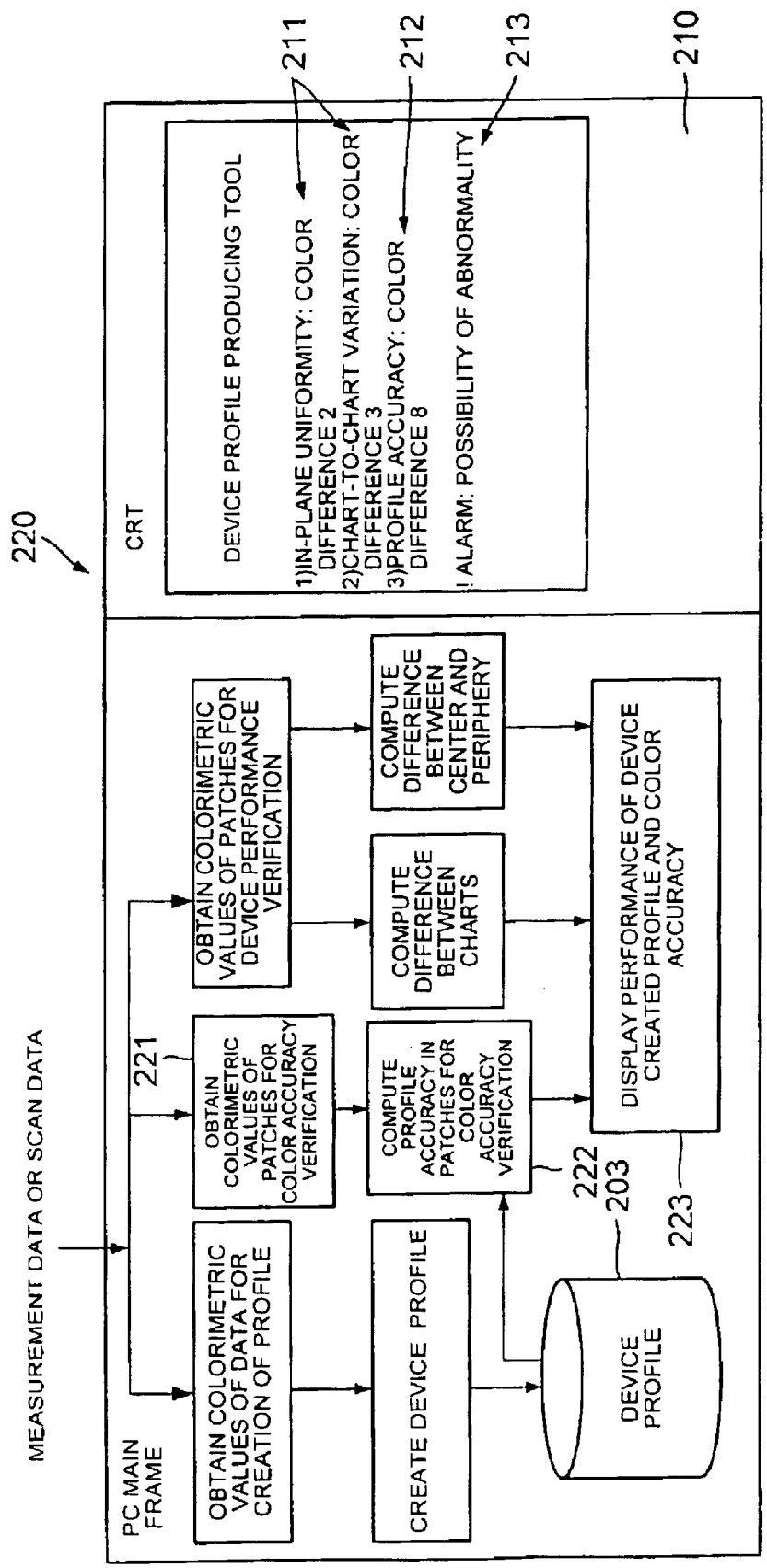
FIG. 15 is a view useful for understanding an example of a utility system of patches for color accuracy verification.

FIG. 15 is a view useful for understanding an example of a utility system of patches for color accuracy verification.

In a profile producing apparatus 220 shown in FIG. 15, further in parallel to a creation of a profile and a verification of a performance of a device as mentioned above, an acquisition 221 of calorimetric data and the like of patches for a color accuracy verification of a profile is executed, and an accuracy computation 222 is performed in accordance with the obtained colorimetric data and the like and the created profile 203. And a display 223 of the device performance and the profile accuracy is performed, so that a value 212 of the color difference representative of the profile accuracy is displayed on the CRT 210 together with values 211 of the color difference representative of the device performance. In the event that the value 212 of the color difference representative of the profile accuracy is larger than the values 211 of the color difference representative of the device performance, an alarm sentence 213 is also displayed.

A user decides whether a suitable profile is created, in accordance with the device performance and the color accuracy displayed on the CRT 210, and as a need arises, the user can instruct to do over again a creation of the profile.

Figure 16:
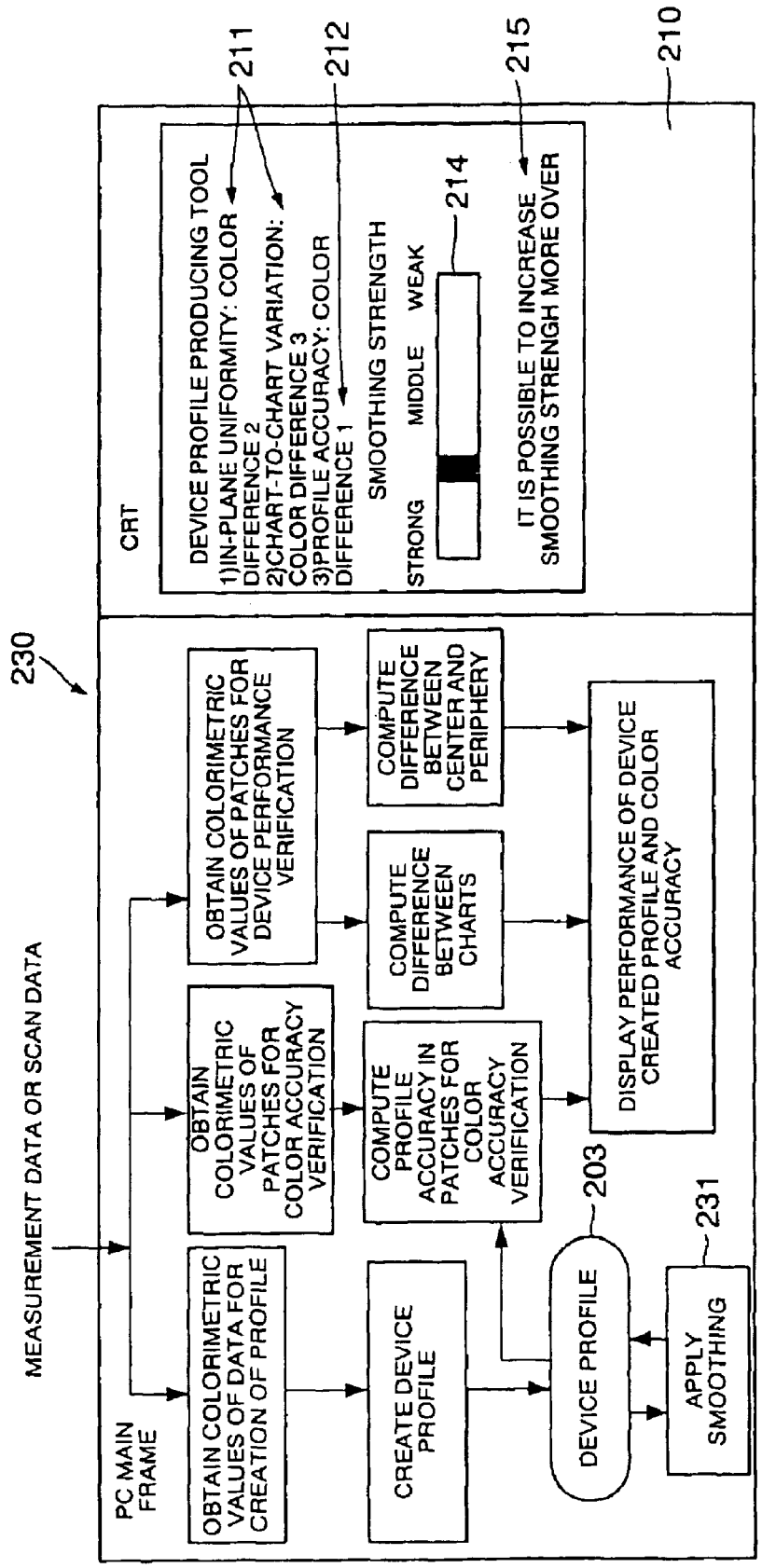
FIG. 16 is a view useful for understanding an alternative example of a utility system of patches and the like for device performance verification.

FIG. 16 is a view useful for understanding an alternative example of a utility system of patches and the like for device performance verification.

The profile producing apparatus 230 shown in FIG. 13 has a function of applying smoothing 231 to a profile 203 to be produced in the manner as mentioned above. The strength of smoothing 231 is set up in such a manner that a user operates a slider bar 214 displayed on a CRT 210.

While an application of the smoothing 231 to the profile 203 generally deteriorates color accuracy, it is preferable to apply so a strong smoothing as much as possible in such a limit that the value 212 of the color difference representative of the profile accuracy is below the values 211 of the color differences representative of the device performance, even after the smoothing 231 is applied.

For this reason, according to the profile producing apparatus 230 shown in FIG. 16, a sentence 215 that the strength of the smoothing is increased or a sentence that the strength of the smoothing is over the limit is displayed on the CRT 210 in accordance with whether the value 212 of the color difference representative of the profile accuracy is below the value 211 of the color difference representative of the device performance.

A user can perform resetting of strength of the smoothing taking into consideration the sentences displayed on the CRT 210, and thereby producing a profile taking into consideration distortion and fluctuation of colors.

Figure 17:
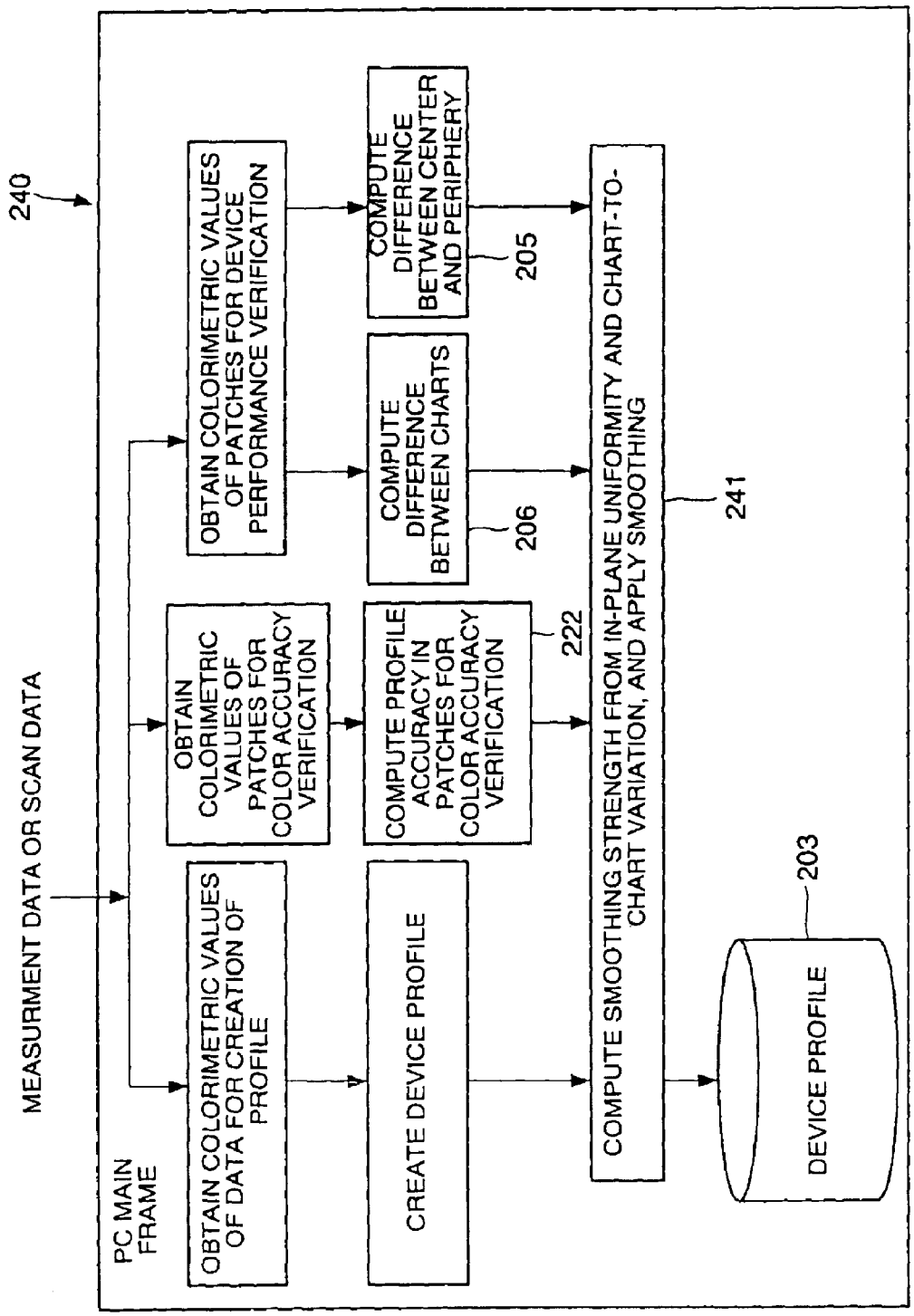
FIG. 17 is a view useful for understanding a further alternative example of a utility system of patches and the like for device performance verification.

FIG. 17 is a view useful for understanding a further alternative example of a utility system of patches and the like for device performance verification.

A profile producing apparatus 240 shown in FIG. 17 has also a function of applying smoothing 241 to a profile 203. In the smoothing 241, a suitable strength is computed in accordance with results of computations 205 and 206 for device performance and a result of an accuracy computation 222 of a profile, and the computed strength of smoothing is automatically applied to the profile 203.

Figure 18:
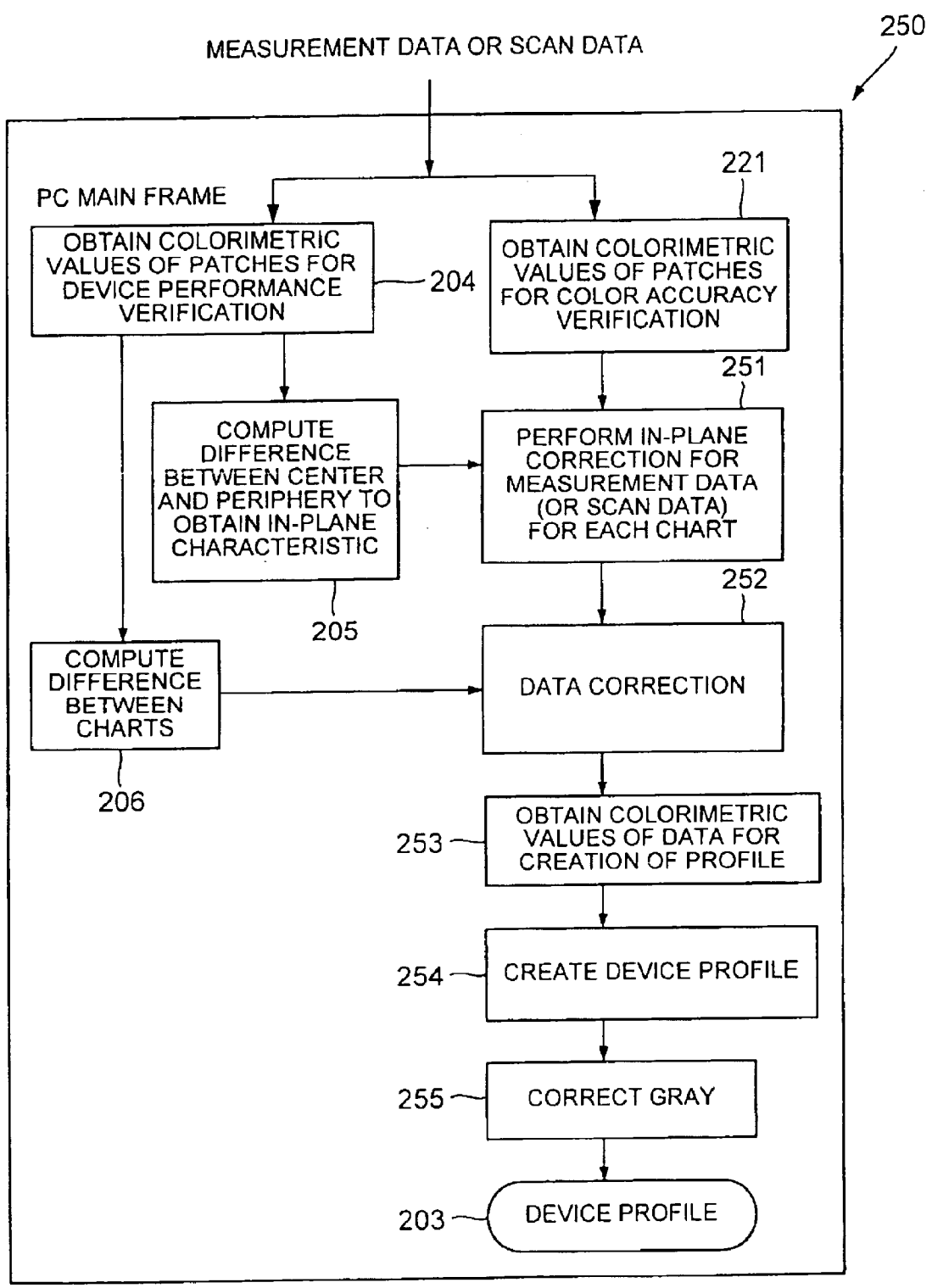
FIG. 18 is a view useful for understanding a furthermore alternative example of a utility system of patches and the like for device performance verification.

FIG. 18 is a view useful for understanding a furthermore alternative example of a utility system of patches and the like for device performance verification.

A color difference between one in which colors of patches for verification of a profile color accuracy are read and the original color of the patches for verification is representative of a deviation of color subjected to input and output by a device from a correct color. A color difference in the in-plane direction, which is representative of a device performance, indicates that a deviation of the color slants in-plane of a chart sheet.

In view of the foregoing, according to a profile producing apparatus 250 shown in FIG. 18, a correction 251 based on a result of a color difference computation 205 for verification patches in-plane of the chart sheet and a result of an acquisition 221 for colorimetric data for color accuracy verification patches is applied to colorimetric data associated with the lattice points of the above-mentioned N×N×N lattice. It is either acceptable that the correction 251 is an individual correction for each chart sheet or an identical correction for each chart sheet.

A color difference between chart sheets of device performance verification patches represents fluctuation of colors to be inputted and outputted by a device.

In view of the foregoing, according to the profile producing apparatus 250, a further correction 252 based on a result of a color difference computation 206 of verification patches between a plurality of charts is applied to colorimetric data after the correction 251 is applied, so that colorimetric data for other chart sheets are corrected to meet with colorimetric data for a predetermined chart sheet.

And an acquisition 253 of data for creation of a profile is executed, and calorimetric data, to which corrections 251 and 252 are applied, are obtained, so that a creation 254 of a profile based on the colorimetric data and the like is executed.

By the way, a color difference between a color in which a series of gray patches 11e are read and an original color of the series of gray patches represents a distortion of the gray axis. Thus, the profile producing apparatus 250 applies a gray correction 255 in accordance with the above-mentioned color difference on the series of gray patches.

Application of those corrections 251, 252 and 255 makes it possible to create a profile 203 with great accuracy.

Figure 19:
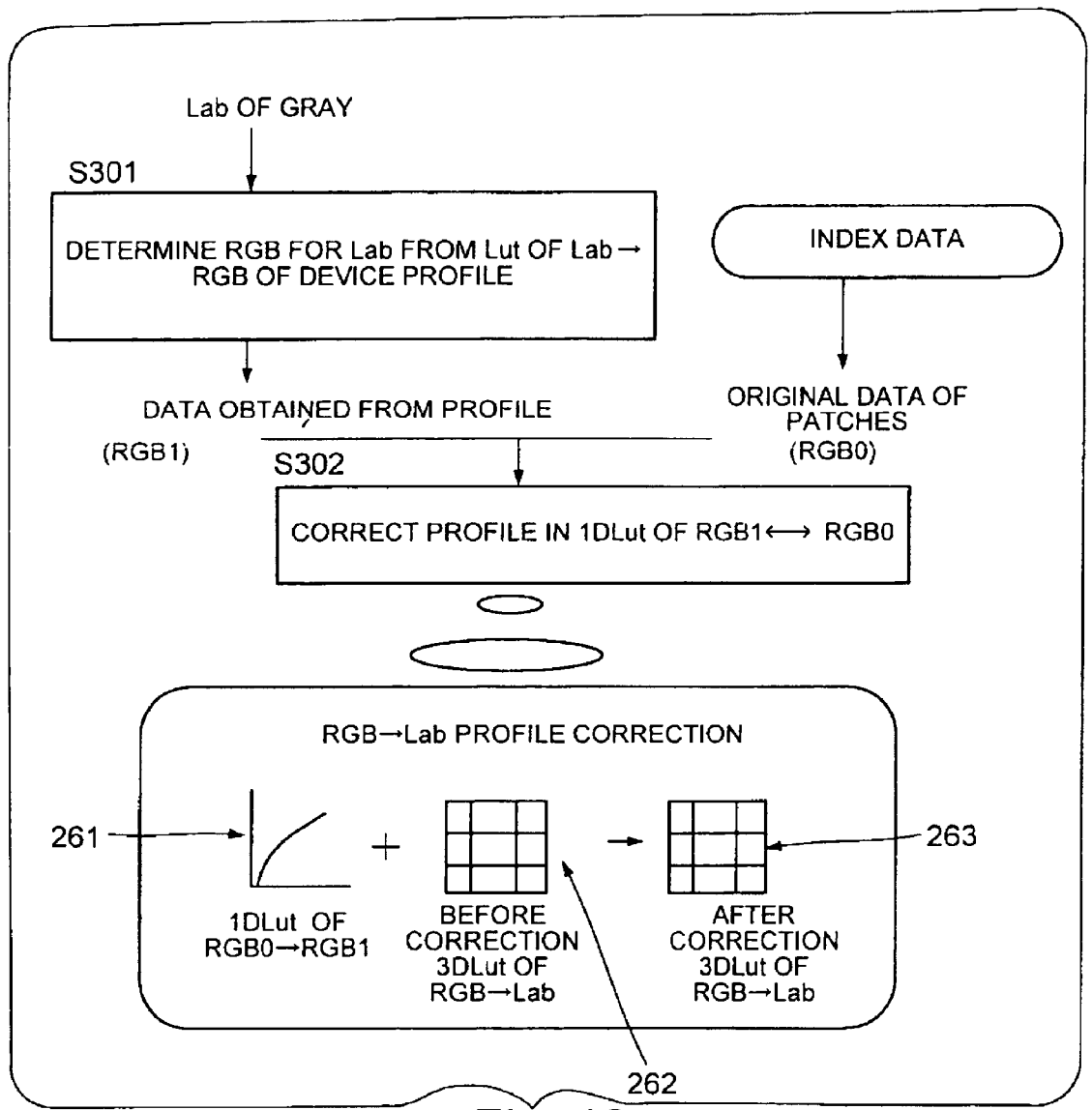
FIG. 19 is a view showing an example of a method of correcting a distortion of a gray axis.

FIG. 19 is a view showing an example of a method of correcting a distortion of a gray axis.

Here, RGB space coordinate values, which are associated with colorimetric data for the above-mentioned series of patches 11e, are determined in accordance with the profile temporarily obtained in the creation 254 of a profile shown in FIG. 18 (a step S301). The coordinate values thus obtained are referred to RGB1 hereinafter. The original RGB space coordinate values of the above-mentioned series of patches 11e are included in the index data 90 explained in conjunction with FIG. 7. The original RGB space coordinate values are referred to RGB0 hereinafter.

Those coordinate values RGB1 and RGB0 are associated with one another so that a one-dimensional LUT 261 is created for each of R, G and B. Thus, a profile is corrected in accordance with those one-dimensional LUTs 261 in the manner as will be described hereinafter (a step S302). That is, RGB coordinate values, which constitute a three-dimensional LUT 262 corresponding to the profile before correction, are converted in accordance with the one-dimensional LUTs 261 to alter the intervals of the above-mentioned lattices, so that a three-dimensional LUT 263 corresponding to the profile after correction is created.

As a method other than the correction method shown in FIG. 19, there is considered, for example, a method in which a portion of the gray axis of the three-dimensional LUT of the profile is directly corrected in accordance with calorimetric data of a series of gray patches, so that portions adjacent to the portion of the gray axis, of the three-dimensional LUT are corrected in such a manner that a correction is made strongly with nearer portion to the gray axis and weakly with farther portion from the gray axis.

Incidentally, according to the above-mentioned embodiments of the present invention, while object portions of use of a color chart are selected in unit of a chart sheet, it is acceptable that up to halfway of a chart sheet is used as the object portions of use.

Further, according to the above-mentioned embodiments of the present invention, while a color chart constituted of a plurality of chart sheets is used, it is acceptable for the color chart of the present invention that patches arranged on the plurality of chart sheets in a predetermined order are essentially arranged on one chart sheet in an equivalent order to the predetermined order.

According to the above-mentioned embodiments of the present invention, as an example of a first patch group of the present invention, there are shown eight pieces of patches associated with lattice points of the 2×2×2 lattice. It is acceptable, however, as the first patch group of the present invention that 27 patches associated with lattice points of, for example, 2×2×2 lattice and 3×3×3 lattice are adopted. In the event that the patch group consisting of such many patches is adopted as the first patch group of the present invention, it is preferable that saturated color patches of black and white lower in saturation are disposed in the vicinity of the center.

It is noted that the order of reading of patches on a chart sheet depends on a scanner and a color measurement machine, and is not restricted to the orders in the above-mentioned embodiments of the present invention.

As mentioned above, according to the present invention, it is possible to enhance general-purpose properties in creation of a profile.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A color chart comprising a plurality of patches in which colors of the plurality of patches are read in accordance with a patch reading order determined beforehand, said color chart including:

a first patch group comprising a plurality of patches each having a predetermined color; and a second patch group comprising a plurality of patches having colors among said predetermined colors, said plurality of patches being read later than the patches constituting said first patch group in accordance with said patch reading order;

wherein the colors of the patches of the second patch group are determined in accordance of with an interpolation computation based on the colors of the patches of the first patch group.

2. A color chart according to claim 1, wherein said first patch group includes patches of saturated colors of red, green, blue, cyan, magenta, yellow, white and black.

3. A color chart according to claim 1, wherein patches, which belong to either one of said first patch group and said second patch group, occupy over half in its entirety.

4. A color chart according to claim 1, wherein said color chart includes patches each having a specific color for accuracy verification.

5. The color chart of claim 1, wherein the colors of the plurality of patches are described by a device-dependent color space formed as an N×N×N lattice, wherein the first patch group comprises colors formed at lattice points of the N×N×N lattice and the second patch group comprises interpolated values of the lattice.

6. The color chart of claim 1, wherein the second patch group comprises colors interpolated from colors of the first patch group.

7. The color chart of claim 1, wherein said color chart further includes a third patch of predetermined color aligned in a column direction and a patch of varying gray values aligned in a central portion of the color chart away from end columns of the color chart.

8. A color chart comprising a plurality of patches in which colors of the plurality of patches are read in accordance with a patch reading order determined beforehand, said color chart including:

a first patch group comprising a plurality of patches each having a predetermined color; and a second patch group comprising a plurality of patches having colors among said predetermined colors, said plurality of patches being read later than the patches constituting said first patch group in accordance with said patch reading order;

wherein same gray patches are disposed at a plurality of places.

9. A color chart comprising a plurality of chart sheets which are sequentially read in accordance with a sheet reading order determined beforehand, said color chart comprising:

a faster-read sheet in which a plurality of patches each having a predetermined color are arranged, said faster-read sheet being relatively faster read in accordance with said sheet reading order; and a later-read sheet in which a plurality of patches having colors among said predetermined colors are arranged, said later-read sheet being relatively later read in accordance with said sheet reading order;

wherein in at least one of said plurality of chart sheets, same gray patches are disposed at a plurality of places.

10. A color chart comprising a plurality of chart sheets which are sequentially read in accordance with a sheet reading order determined beforehand, said color chart comprising:

a faster-read sheet in which a plurality of patches each having a predetermined color are arranged, said faster-read sheet being relatively faster read in accordance with said sheet reading order; and a later-read sheet in which a plurality of patches having colors among said predetermined colors are arranged, said later-read sheet being relatively later read in accordance with said sheet reading order;

wherein in said plurality of chart sheets, same gray patches are disposed at common places of the chart sheets.

11. A color chart comprising a plurality of patches in which colors of the plurality of patches are read in accordance with a patch reading order determined beforehand, said color chart including:
   a first patch group comprising a plurality of patches each having a predetermined color; and
   a second patch group comprising a plurality of patches having colors among said predetermined colors, said plurality of patches being read later than the patches constituting said first patch group in accordance with said patch reading order;
   wherein patches having relatively high saturation of colors are arranged outside more than patches having relatively low saturation of colors.

12. A color chart comprising a plurality of chart sheets which are sequentially read in accordance with a sheet reading order determined beforehand, said color chart comprising:
   a faster-read sheet in which a plurality of patches each having a predetermined color are arranged, said faster-read sheet being relatively faster read in accordance with said sheet reading order; and
   a later-read sheet in which a plurality of patches having colors among said predetermined colors are arranged, said later-read sheet being relatively later read in accordance with said sheet reading order;
   wherein patches having relatively high saturation of colors are arranged outside more than patches having relatively low saturation of colors.

13. A color chart comprising a plurality of chart sheets which are sequentially read in accordance with a sheet reading order determined beforehand, said color chart comprising:
   a faster-read sheet in which a plurality of patches each having a predetermined color are arranged, said faster-read sheet being relatively faster read in accordance with said sheet reading order; and
   a later-read sheet in which a plurality of patches having colors among said predetermined colors are arranged, said later-read sheet being relatively later read in accordance with said sheet reading order;
   wherein said color chart includes patches each having a specific color for accuracy verification.

14. A chart image data recording medium storing chart image data representative of a color chart comprising a plurality of patches in which colors of the plurality of patches are read in accordance with a patch reading order determined beforehand, said color chart including:
   a first patch group comprising a plurality of patches each having a predetermined color; and
   a second patch group comprising a plurality of patches having colors among said predetermined colors, said plurality of patches being read later than the patches constituting said first patch group in accordance with patch reading order;
   wherein the colors of the patches of the second patch group are determined in accordance with an interpolation computation based on the colors of the patches of the first patch group.

15. A chart image data recording medium storing chart image data representative of a color chart comprising a plurality of chart sheets which are sequentially read in accordance with a sheet reading order determined beforehand, said color chart comprising:
   a faster-read sheet in which a plurality of patches each having a predetermined color are arranged, said faster-read sheet being relatively faster read in accordance with said sheet reading order; and
   a later-read sheet in which a plurality of patches having colors among said predetermined colors are arranged, said later-read sheet being relatively later read in accordance with said sheet reading order.

16. A profile producing apparatus comprising:
   a data obtaining section for obtaining read data in which patches, constituting a color chart comprising a plurality of patches in which colors of the plurality of patches are read in accordance with a patch reading order determined beforehand, are read in accordance with the patch reading order, said color chart including a first patch group comprising a plurality of patches each having a predetermined color, and a second patch group comprising a plurality of patches having colors among said predetermined colors, said plurality of patches being read later than the patches constituting said first patch group in accordance with said patch reading order; and
   a profile producing section for producing a profile defining an association between coordinate points on a color space depending on a device performing at least one of input and output of a color image and coordinate points on a color space independent of said device in accordance with the read data obtained by said data obtaining section.

17. A profile producing apparatus comprising:
   a data obtaining section for obtaining read data in which at least one of chart sheets constituting a color chart comprising a plurality of chart sheets which are sequentially read in accordance with a sheet reading order determined beforehand, is read in accordance with the sheet reading order, said color chart comprising a faster-read sheet in which a plurality of patches each having a predetermined color are arranged, said faster-read sheet being relatively faster read in accordance with said sheet reading order, and a later-read sheet in which a plurality of patches having colors among said predetermined colors are arranged, said later-read sheet being relatively later read in accordance with said sheet reading order; and
   a profile producing section for producing a profile defining an association between coordinate points on a color space depending on a device performing at least one of input and output of a color image and coordinate points on a color space independent of said device in accordant with the read data obtained by said data obtaining section.

18. A profile producing apparatus according to claim 17, wherein said data obtaining section obtains the read data by a corresponding number of the chart sheets based on a performance of said device.

19. A profile producing apparatus according to claim 17, wherein said data obtaining section obtains the read data one by one corresponding of the chart sheets in accordance with the said sheet reading order, and said data obtaining section judges whether a subsequent chart sheet of read data is to be obtained, and when it is decided that the subsequent chart sheet of read data is to be obtained, said data obtaining section obtains a subsequent chart sheet of read data.

20. A profile producing method comprising:
   a data obtaining step of obtaining read data in which patches, constituting a color chart comprising a plurality of patches in which colors of the plurality of patches are read in accordance with a patch reading order determined beforehand, are read in accordance with the patch reading order, said color chart including a first patch group comprising a plurality of patches each having a predetermined color, and a second patch group comprising a plurality of patches having colors among said predetermined colors, said plurality of patches being read later than the patches constituting said first patch group in accordance with said patch reading order; and a profile producing step of producing a profile defining an association between coordinate points on a color space depending on a device performing at least one of input and output of a color image and coordinate points on a color space independent of said device in accordance with the read data obtained by said data obtaining section.

21. A profile producing method comprising:

a data obtaining step of obtaining read data in which at least one of chart sheets constituting a color chart comprising a plurality of chart sheets which are sequentially read in accordance with a sheet reading order determined beforehand, is read in accordance with the sheet reading order, said color chart comprising a faster-read sheet in which a plurality of patches each having a predetermined color are arranged, said faster-read sheet being relatively faster read in accordance with said sheet reading order, and a later-read sheet in which a plurality of patches having colors among said predetermined colors are arranged, said later-read sheet being relatively later read in accordance with said sheet reading order; and a profile producing step of producing a profile defining an association between coordinate points on a color space depending on a device performing at least one of input and output of a color image and coordinate points on a color space independent of said device in accordance with the read data obtained by said data obtaining section.

22. A profile producing program storage medium storing a profile producing program, which causes a computer to serve as a profile producing apparatus comprising:

a data obtaining section for obtaining read data in which patches, constituting a color chart comprising a plurality of patches in which colors of the plurality of patches are read in accordance with a patch reading order determined beforehand, are read in accordance with the patch reading order, said color chart including a first patch group comprising a plurality of patches each having a predetermined color, and a second patch group comprising a plurality of patches having colors among said predetermined colors, said plurality of patches being read later than the patches constituting said first patch group in accordance with said patch reading order; and a profile producing section for producing a profile defining an association between coordinate points on a color space depending on a device performing at least one of input and output of a color image and coordinate points on a color space independent of said device in accordance with the read data obtained by said data obtaining section, when said profile producing program storage medium is incorporated into said computer.

23. A profile producing program storage medium storing a profile producing program, which causes a computer to serve as a profile producing apparatus comprising:

a data obtaining section for obtaining read data in which at least one of chart sheets constituting a color chart comprising a plurality of chart sheets which are sequentially read in accordance with a sheet reading order determined beforehand, is read in accordance with the sheet reading order, said color chart comprising a faster-read sheet in which a plurality of patches each having a predetermined color are arranged, said faster-read sheet being relatively faster read in accordance with said sheet reading order, and a later-read sheet in which a plurality of patches having colors among said predetermined colors are arranged, said later-read sheet being relatively later read in accordance with said sheet reading order; and a profile producing section for producing a profile defining an association between coordinate points on a color space depending on a device performing at least one of input and output of a color image and coordinate points on a color space independent of said device in accordance with the read data obtained by said data obtaining section, when said profile producing program storage medium is incorporated into said computer.

24. A color chart comprising a plurality of chart sheets which are sequentially read in accordance with a sheet reading order determined beforehand, said color chart comprising:

a faster-read sheet in which a plurality of patches each having a predetermined color are arranged, said faster-read sheet being relatively faster read in accordance with said sheet reading order; and a later-read sheet in which a plurality of patches having colors among said predetermined colors are arranged, said later-read sheet being relatively later read in accordance with said sheet reading order;

wherein the colors of the patches of the later-read sheet are computed in accordance with an interpolation computation based on the colors of the patches of the faster-read sheet.

25. A color chart according to claim 24, wherein a series of gray patches used for calibration for a gray axis are disposed in the vicinity of the center of the faster-read sheet.

* * * * *